US009336556B2

(12) United States Patent  (10) Patent No.: US 9,336,556 B2
Kawazu  (45) Date of Patent: May 10, 2016

(54) IMAGE PROCESSING APPARATUS AND METHOD THEREOF

(71) Applicant: CANON KABUSHIKI KAISHA, Tokyo (JP)

(72) Inventor: Ayuta Kawazu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 14/150,792

(22) Filed: Jan. 9, 2014

(65) Prior Publication Data

US 2014/0211979 A1 Jul. 31, 2014

(30) Foreign Application Priority Data

Jan. 31, 2013 (JP) ................................. 2013-017635

(51) Int. Cl.
  G06K 9/00 (2006.01)
  G06T 1/00 (2006.01)
  G06T 3/40 (2006.01)

(52) U.S. Cl.
  CPC ............. *G06T 1/0028* (2013.01); *G06T 3/4015* (2013.01); *G06T 2201/0201* (2013.01)

(58) Field of Classification Search
  CPC ................ G06T 3/4015; G06T 1/0028; G06T 2201/0201; G06T 3/4007
  USPC .................................................. 382/100, 165
  See application file for complete search history.

(56) References Cited

U.S. PATENT DOCUMENTS

| | | | | |
|---|---|---|---|---|
| 5,053,861 A * | 10/1991 | Tsai | ...................... | G06T 3/4007 348/231.6 |
| 7,027,091 B1 * | 4/2006 | Reyneri | ............... | H04N 5/3572 348/273 |
| 8,160,293 B1 * | 4/2012 | Fridrich | ............. | G06K 9/00899 382/100 |
| 8,189,012 B2 * | 5/2012 | Yang | ................... | H04N 5/23248 345/611 |
| 8,441,562 B1 * | 5/2013 | Szedo | .................... | H04N 9/045 348/275 |
| 8,761,504 B2 * | 6/2014 | Hirakawa | .............. | G06T 1/0007 348/273 |
| 8,983,115 B2 * | 3/2015 | Kawazu | ................ | G06T 1/0028 382/100 |
| 2002/0009208 A1 * | 1/2002 | Alattar | .............. | G06F 17/30876 382/100 |
| 2005/0276475 A1 * | 12/2005 | Sawada | .................. | H04N 1/648 382/167 |
| 2012/0127347 A1 * | 5/2012 | Kim | ........................ | 348/231.99 |

OTHER PUBLICATIONS

Alin C. Popescu and Hany Farid,"Exposing Digital Forgeries in Color Filter Array Interpolated Images", IEEE2005.*
Hong Cao and Alex C. Kot, Fellow,"Accurate Detection of Demosaicing Regularity for Digital Image Forensics",IEEE 2009.*
Ahmet Emir Dirik, Nasir Memon "Image Tamper Detection Based on Demosaicing Artifacts" ICIP 2009 IEEE, p. 1497-1500.

* cited by examiner

*Primary Examiner* — Stephen R Koziol
*Assistant Examiner* — Shaghayegh Azima
(74) *Attorney, Agent, or Firm* — Rossi, Kimms & McDowell LLP

(57) ABSTRACT

Pattern information of a color filter array and algorithm information of color interpolation processing used in photography of input image data are obtained. Comparative image data is generated from the input image data using the pattern information and algorithm information. The comparative image data and input image data are compared to detect alteration of the input image data.

15 Claims, 17 Drawing Sheets

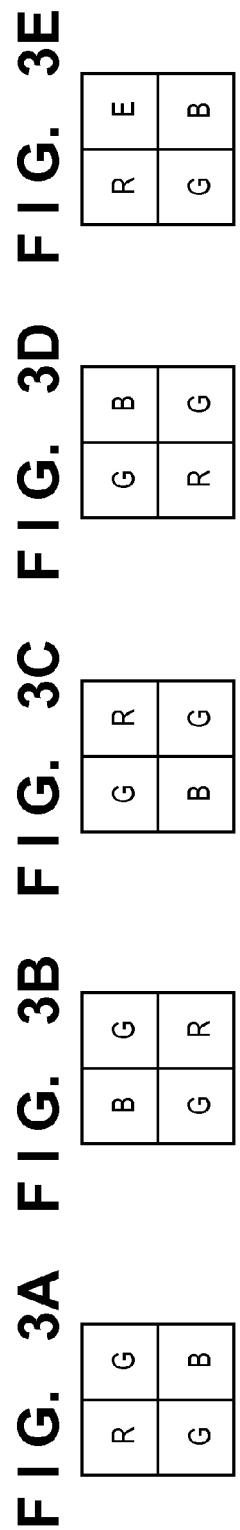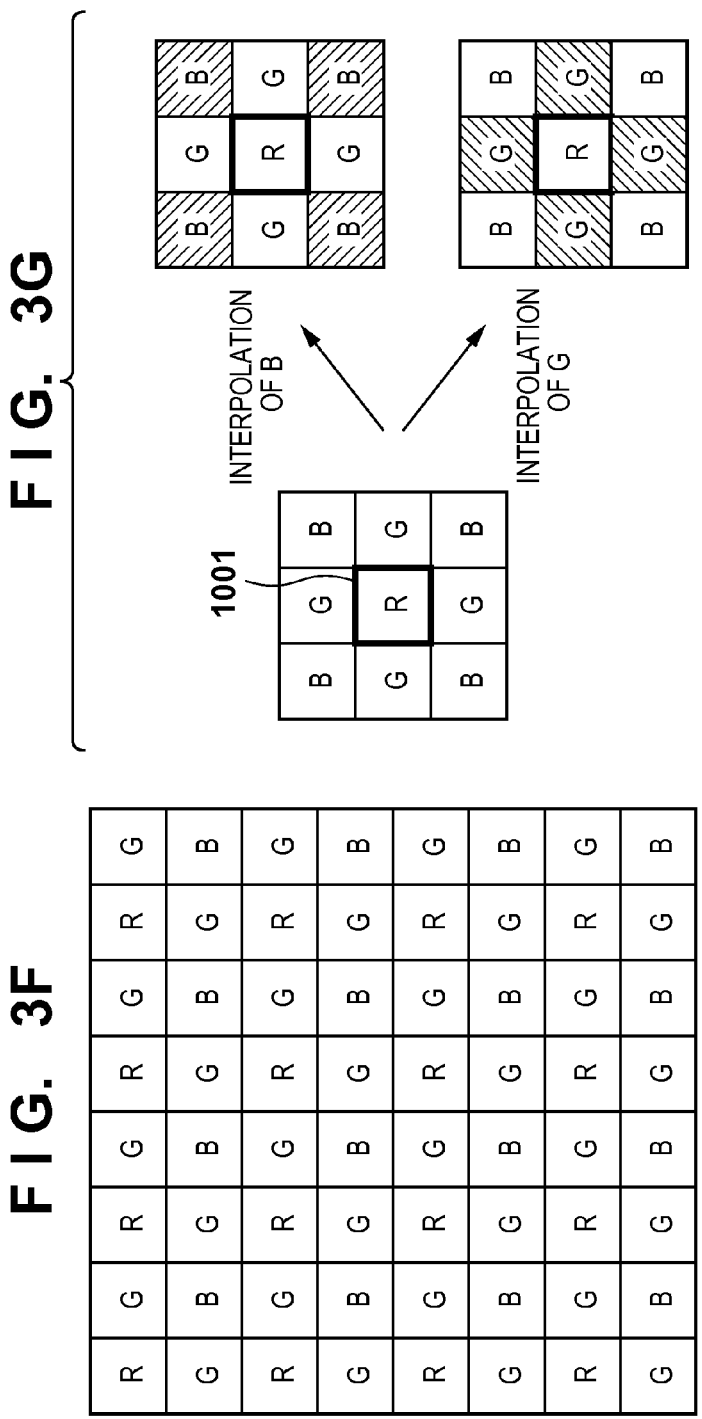

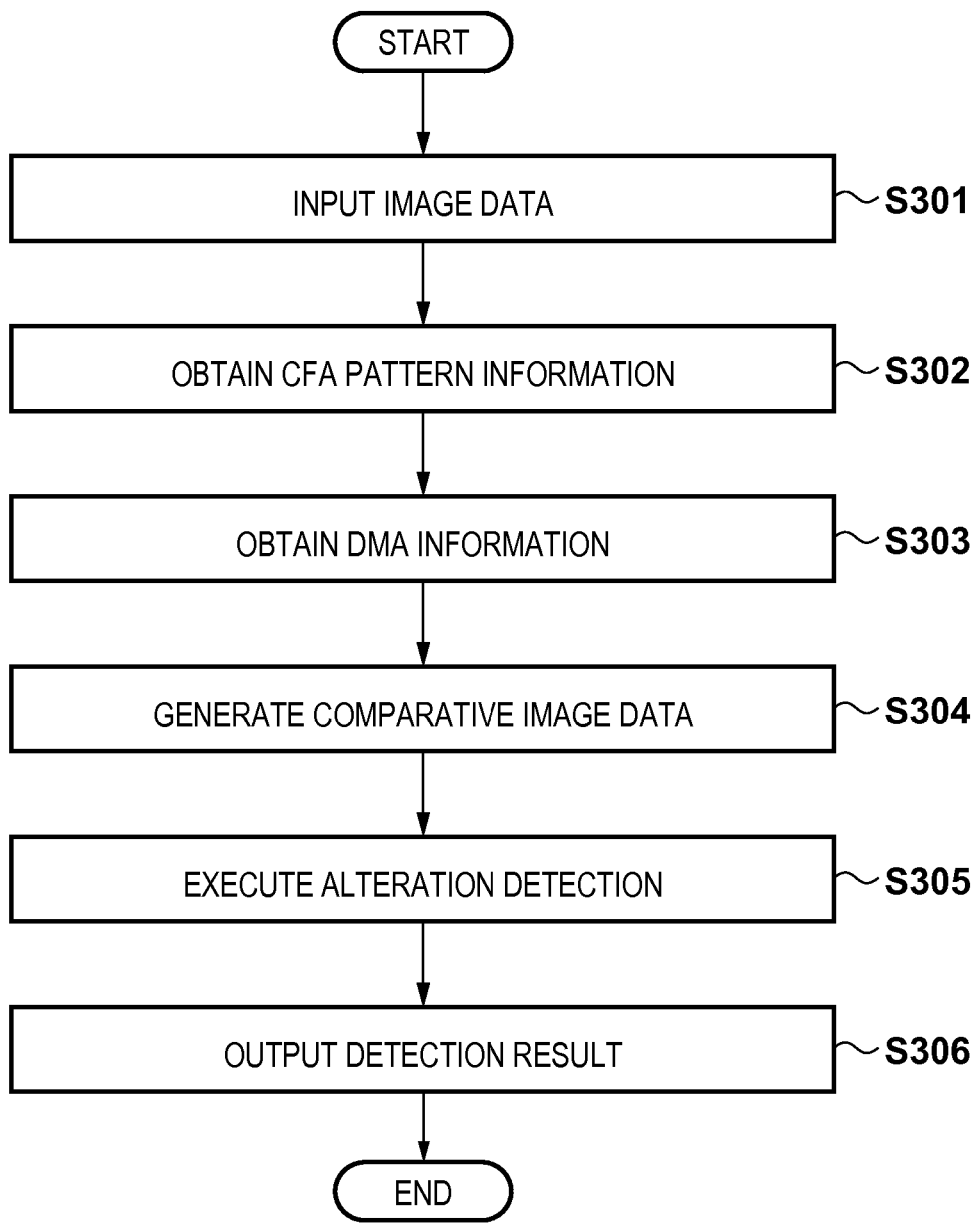

IMAGE PROCESSING APPARATUS AND METHOD THEREOF

BACKGROUND OF THE INVENTION

1. Field of the Invention

The present invention relates to image processing for detecting an alteration position of a photography image.

2. Description of the Related Art

The following technique for detecting alteration of an image photographed by a compact digital camera, single-lens reflex digital camera, or the like has been proposed. This technique detects alteration by analyzing a pattern originally included in a photography image and comparing feature amounts for respective regions without embedding any additional information such as a digital watermark in the photography image. Since no additional information such as a digital watermark is embedded, this technique can advantageously detect alteration without causing image quality deterioration of a photography image and an increase in processing time due to embedding of additional information.

Ahmet Emir Dirik, Nasir Memon "IMAGE TAMPER DETECTION BASED ON DEMOSAICING ARTIFACTS" ICIP 2009, pp. 1497-1500 (literature 1) estimates and analyzes a color filter array (CFA) pattern of an image sensor such as a CMOS sensor or charge coupled device (CCD) of a camera, and uses the CFA pattern in alteration detection. The CFA pattern is, for example, an RGB color filter arrangement, and indicates an RGB light-receiving pattern of each cell (a unit corresponding to a pixel in an image) of the image sensor.

Many image sensors distributed in the market have an arrangement in which each cell obtains color information of any of R, G, and B, so as to attain a cost reduction. The image sensor uses the CFA represented by a Bayer arrangement so as to efficiently obtain color information, and obtains color information from incoming light. The CFA is regularly and periodically arranged on the image sensor to have, for example, a square arrangement of 2×2 cells as a unit.

The technique of literature 1 estimates a CFA pattern of the image sensor from a full-color image using bilinear or bicubic interpolation processing, and detects a position where the periodicity of the estimated CFA pattern is corrupted as an alteration position, thus implementing alteration detection.

However, only four types of Bayer arrangements as CFA patterns used in many cameras are available. Therefore, although an image is altered, the CFA pattern may match that of an original photography image with probability of 1/4 to exhibit periodicity, and alteration may not be detected. In other words, a detection percentage of alteration detection using the CFA pattern is 75% at most.

When a CFA pattern is estimated using the bilinear or bicubic interpolation processing regardless of any demosaicing processing which develops a photography image, a wrong CFA pattern may be estimated. For this reason, the detection percentage of alteration detection often becomes lower.

SUMMARY OF THE INVENTION

In one aspect, an image processing apparatus comprising: an obtaining unit configured to obtain pattern information of a color filter array and algorithm information of color interpolation processing used in photography of input image data; a generation unit configured to generate comparative image data from the input image data using the pattern information and the algorithm information; and a detection unit configured to compare the comparative image data with the input image data to detect alteration of the input image data.

According to the aspect, the detection percentage in alteration detection of image data can be raised.

Further features of the present invention will become apparent from the following description of exemplary embodiments with reference to the attached drawings.

BRIEF DESCRIPTION OF THE DRAWINGS

FIGS. 3A to 3G are views showing examples of CFA.

FIG. 9 is a flowchart for explaining alteration detection processing.

DESCRIPTION OF THE EMBODIMENTS

Image processing according to an embodiment of the present invention will be described in detail hereinafter with reference to the drawings.

First Embodiment

[Apparatus Arrangement]

Figure 1:
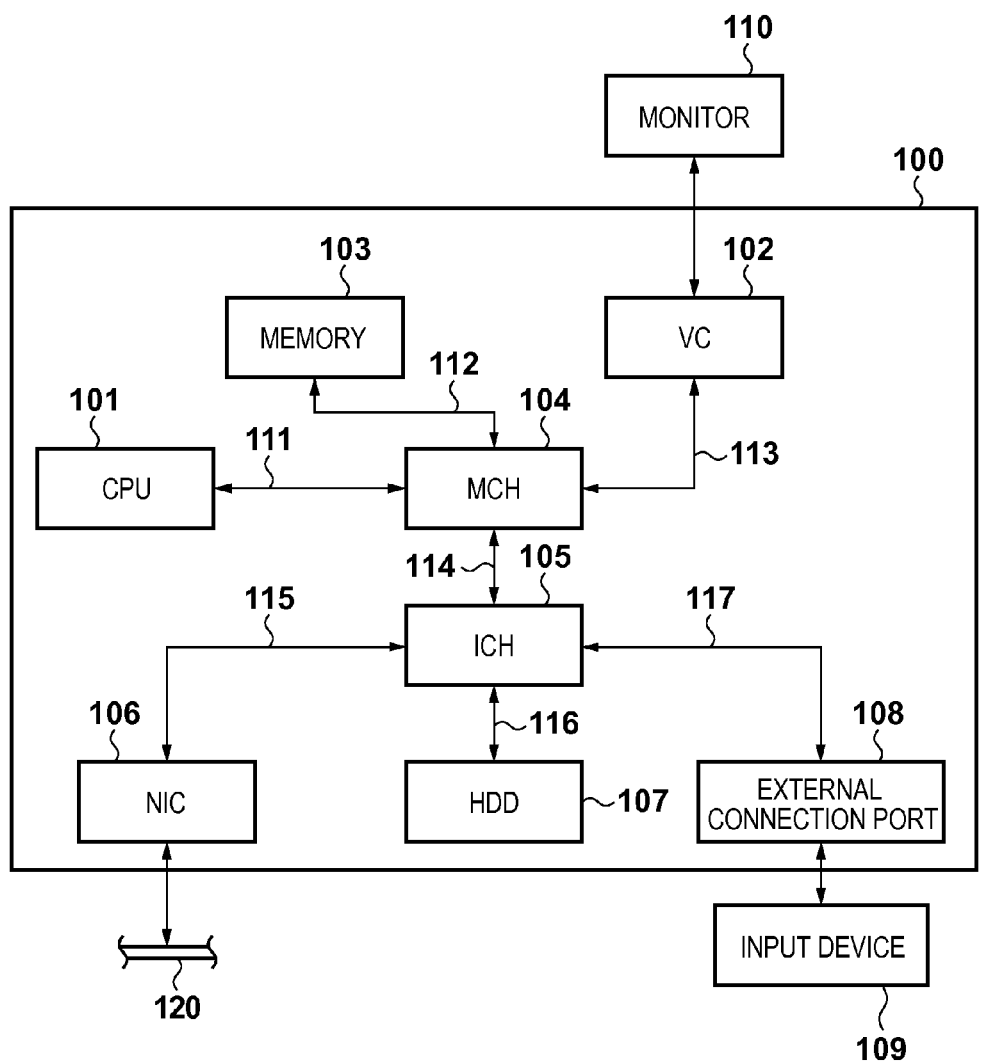
FIG. 1 is a block diagram showing the arrangement of an image processing apparatus according to an embodiment.

FIG. 1 is a block diagram showing the arrangement of an image processing apparatus 100 according to an embodiment.

A microprocessor (CPU) 101 controls all or some of operations of the image processing apparatus 100 by executing programs stored in a memory 103 and hard disk drive (HDD) 107 using the memory 103 as a work memory. Note that the memory 103 includes a random access memory (RAM), read only memory (ROM), and the like. A video controller (VC) 102 executes control for displaying a screen including images, characters, and the like on a monitor 110 according to an instruction from the CPU 101.

A memory controller hub (MCH) 104 is a so-called "north bridge" for controlling data transfer between the CPU 101, the video controller (VC) 102, the memory 103, and an input/output controller hub (ICH) 105 via links 111 to 114. The ICH 105 is a so-called "south bridge" for controlling data transfer between a network interface card (NIC) 106, the HDD 107, and an external connection port 108 via links 115 to 117. Note that the links 111 to 117 include, for example, parallel or serial buses such as PCI (Peripheral Component Interconnect) or PCI Express® or serial buses such as Serial ATA or USB (Universal Serial Bus).

The network interface card (NIC) 106 is a communication interface required to connect to a wired or wireless network 120. The HDD 107 stores an operating system (OS), various programs, various data, and the like to be executed by the CPU 101. The external connection port 108 is, for example, a port of a serial bus such as USB or IEEE1394, which is required to connect an external apparatus to the image processing apparatus 100. By connecting an input device 109 to the external connection port 108, the image processing apparatus 100 can obtain data from the input device 109. Note that the input device 109 is a device used to input data to the image processing apparatus 100 via the external connection port 108, and is, for example, a keyboard, a pointing device such as a mouse, or an image capturing device or image input device such as a digital camera. When a High-Definition Multimedia Interface (HDMI®) port is prepared as the external connection port 108, the monitor 110 can be connected to the external connection port 108.

Note that the image processing apparatus 100 can be implemented by supplying a program required to execute processing (to be described later) to, for example, a personal computer.

[Functional Arrangement]

Figure 2:
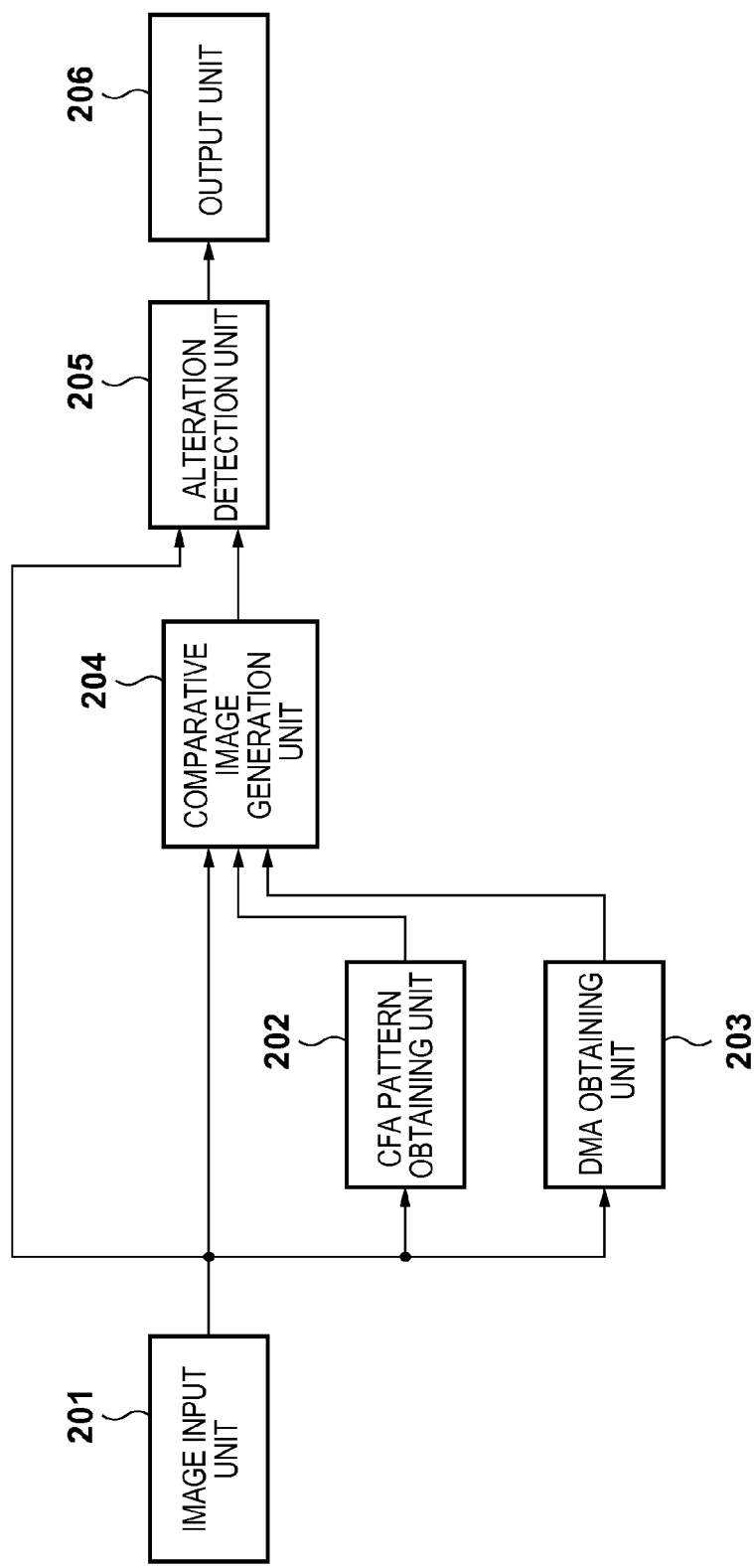
FIG. 2 is a block diagram for explaining the functional arrangement of an image processing apparatus according to the first embodiment.

The functional arrangement of the image processing apparatus 100 according to the first embodiment will be described below with reference to the block diagram shown in FIG. 2. This functional arrangement is implemented when the CPU 101 executes an image processing program according to the first embodiment.

An image input unit 201 inputs image data from the input device 109 via the external connection port 108, and stores input image data in a predetermined area of the memory 103, HDD 107, or the like. The input image data is image data which represents an image photographed by a digital camera, and its data format is, for example, JPEG (Joint Photographic Experts Group), TIFF (Tagged Image File Format), or RAW.

A CFA pattern obtaining unit 202 obtains a CFA pattern of the input image data with reference to metadata appended to the input image data, and stores the obtained CFA pattern in a predetermined area of the memory 103, HDD 107, or the like. The CFA pattern of a photography image is appended to image data as, for example, Exif (Exchangeable image file format) information as known metadata.

FIGS. 3A to 3G show examples of CFA patterns. FIGS. 3A to 3D show Bayer arrangements, and FIG. 3E shows a CFA (Color Filter Array) pattern in which emerald green E is arranged in one of two cells of green G of the Bayer arrangement. A CFA pattern is regularly and periodically arranged on an image sensor, as shown in, for example, FIG. 3F. A CFA pattern of a photography image is converted into an ID in a format such that a CFA pattern shown in, for example, FIG. 3A is a value "0", and that shown in FIG. 3B is a value "1", and is stored in the metadata.

A DMA obtaining unit 203 obtains information of a demosaicing algorithm (to be referred to as "DMA" hereinafter) as algorithm information of color interpolation processing used in development of the input image data with reference to the metadata appended to the input image data. Then, the DMA obtaining unit 203 stores the obtained DMA information in a predetermined area of the memory 103, HDD 107, or the like. Note that details of the DMA information obtaining method will be described later.

A comparative image generation unit 204 applies re-demosaicing to the input image data using the obtained CFA pattern and DMA to generate a comparative image, and stores data of the generated comparative image as comparative image data in a predetermined area of the memory 103, HDD 107, or the like. Note that details of re-demosaicing will be described later.

An alteration detection unit 205 detects alteration by comparing the comparative image data and input image data, and stores pixel coordinates of alteration-detected pixels as a detection result in a predetermined area of the memory 103 or the like. When the input image data and comparative image data are compared in block units, upper left pixel coordinates of each alteration-detected block and a size of the block are stored in a predetermined area of the memory 103 or the like.

An output unit 206 outputs the detection result of the alteration detection unit 205. The detection result is visually displayed on, for example, the monitor 110 as the alteration detection result of the input image data. This visualization is attained by, for example, superimposing a rectangular frame indicating blocks included in an alteration detection region or an outline of that region on an image represented by the input image data.

Obtainment of DMA

Figures 4, 5:
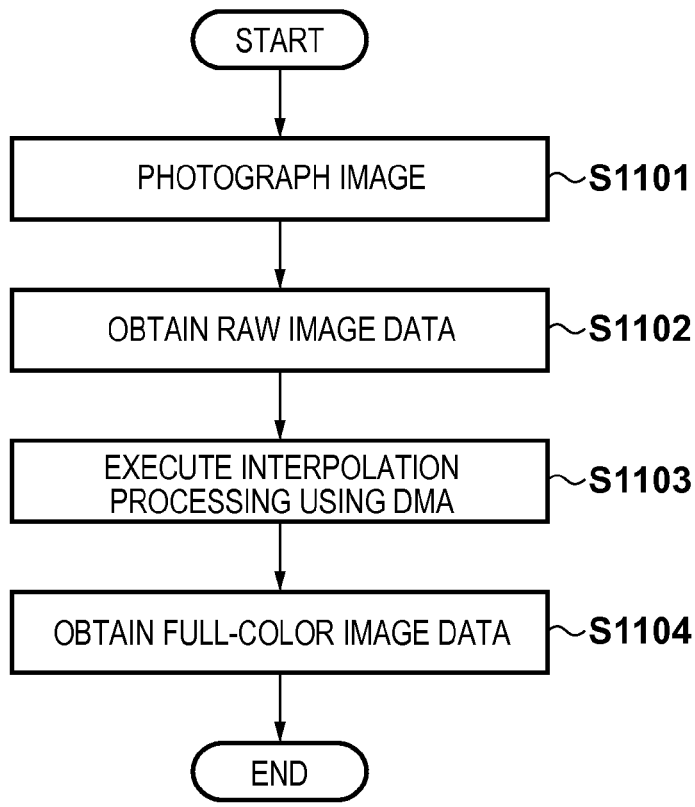
FIG. 4 is a flowchart for explaining the processing of a digital camera at a photography timing.
FIG. 5 is a table showing an example of a database which associates photography camera models and DMAs with each other.

Processing of a digital camera at a photography timing will be described below with reference to the flowchart shown in FIG. 4.

By an image capturing operation, an optical image of an object is photoelectrically converted and is converted into a digital signal (S1101), and the digital signal is obtained as RAW image data (S1102). Color information of the RAW image data depends on a CFA pattern of the image sensor, and in case of the CFA shown in FIG. 3A, pieces of color information of respective pixels of the RAW image data are as shown in FIG. 3F.

Since each pixel of the RAW image data has only one color information, as described above, RGB color information is required to be provided to each pixel (full-color conversion). Thus, in order to give RGB color information to each pixel, lacking color components are interpolated from surrounding pixels (S1103). For example, since a pixel 1001 of interest shown in FIG. 3G has an R component alone, a lacking B component is interpolated from B components of surrounding four pixels, and a lacking G component is interpolated from G components of surrounding four pixels. By executing developing processing including such interpolation processing, full-color image data is obtained from the RAW image data (S1104).

Such interpolation processing of color components is called "demosaicing processing", and an algorithm used in the interpolation processing is called a "demosaicing algorithm (DMA)". As DMA types, for example, bilinear interpolation, nearest neighbor interpolation, and the like are available. Furthermore, Variable Number of Gradients (VNG) interpolation, Patterned Pixel Grouping (PPG) interpolation, Adaptive Homogeneity-Directed (AHD) interpolation, and the like are also used.

Since the DMA has one-to-one correspondence with a camera model, image sensor, or the like, the DMA can be specified using photography camera information obtained from Exif information of image data. FIG. 5 shows an example of a database (DB) 801 which associates photography camera models and DMAs with each other. For example, using the DB 801, a DMA can be specified using photography camera information obtained from Exif information. For example, when obtained photography camera information indicates "camera C", "VNG interpolation" is specified as a DMA from the DB 801. DMA information stored in the DB 801 may have a program format which can execute a corresponding DMA, or may be identification information (ID) used to specify a DMA. Note that the DB 801 may be stored in, for example, the HDD 107 or can be obtained from a storage medium such as a USB memory connected to the external connection port 108.

Re-Demosaicing

Processing for demosaicing the input image data based on the obtained CFA pattern and DMA is called "re-demosaicing".

Figure 16:
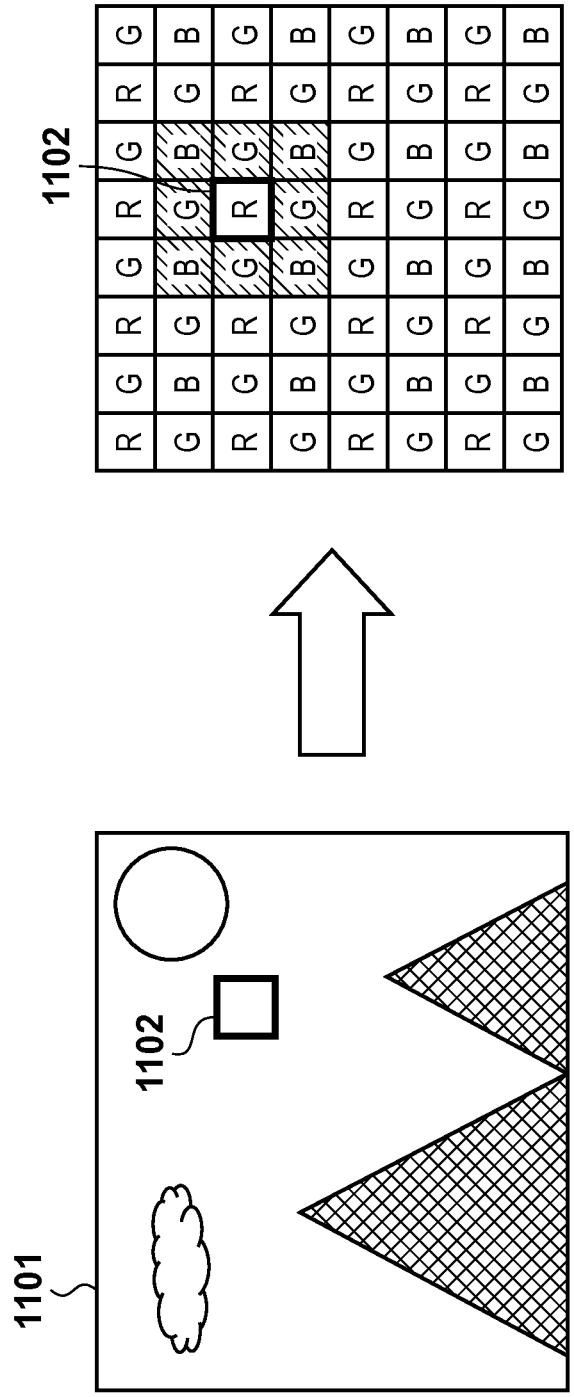
FIG. 16 is a view showing the relationship between a pixel of interest of image data and CFA pattern.

Since the input image data is full-color image data, one pixel has values of all RGB components unlike RAW image data. FIG. 16 shows an example of the input image data. For example, when the obtained CFA pattern is that shown in FIG. 3A, and the obtained DMA is bilinear interpolation, a pixel 1102 of interest of input image data 1101 shown in FIG. 16 is replaced according to the CFA pattern shown in FIG. 3A by re-demosaicing.

Since the pixel 1102 of interest corresponds to an R component in the CFA pattern, the R component of the pixel 1102 of interest remains unchanged, B components of the pixel 1102 of interest are replaced by an average value of B components of surrounding four pixels, and G components are replaced by an average value of G components of the surrounding four pixels, as shown in FIG. 3G. This processing according to the CFA pattern is applied to all pixels of the image data 1101. That is, the re-demosaicing is processing for applying processing equivalent to demosaicing applied to RAW image data at the time of photography to the input image data.

If input image data is free from any alteration, pixel values of comparative image data generated from the input image data by re-demosaicing are to be approximate to those at the same positions of the input image data. On the other hand, if input image data has been altered, pixel values of comparative image data are different from those of the input image data at an alteration position. Note that a pixel value is a value which represents a feature of a pixel, and is, for example, a R, G, or B component value or luminance value.

Alteration detection is implemented by comparing a pixel value of each pixel of the input image data and that of a corresponding pixel of the comparative image data. For example, a difference between a pixel value of a pixel of pixel coordinates (X, Y) (to be referred to as "pixel (X, Y)" hereinafter) of the input image data and that of a pixel (X, Y) of the comparative image data is calculated. Then, when the pixel value difference is less than a predetermined threshold, the pixel (X, Y) of the input image data is determined as an original pixel; when the difference is not less than the threshold, it is determined as an altered pixel.

In place of comparison for each pixel, alteration detection may be executed by comparison for each block. A block is a, for example, a square region of Z×Z pixels, and when Z=4, the input image data and comparative image data are compared for each block of 4×4 pixels. Alternatively, instead of pixel values from pixels in each block, a feature amount calculated from pixels in each block may be used as that of the block, and alteration detection may be executed by comparing feature amounts. That is, by comparing a feature amount of each block of the input image data and that of a corresponding block of the comparative image data, alteration detection for each block is executed. Note that blocks may be divided to overlap each other or not to overlap each other.

[Alteration Detection]

Alterations detectable from input image data and comparative image data will be described below. Note that the following description will exemplify a case in which an R component of a pixel is used in alteration detection, but another component G or B or a luminance value, or their combination can be used in alteration detection.

Case of Different CFA Patterns and Identical DMA

Figure 6:
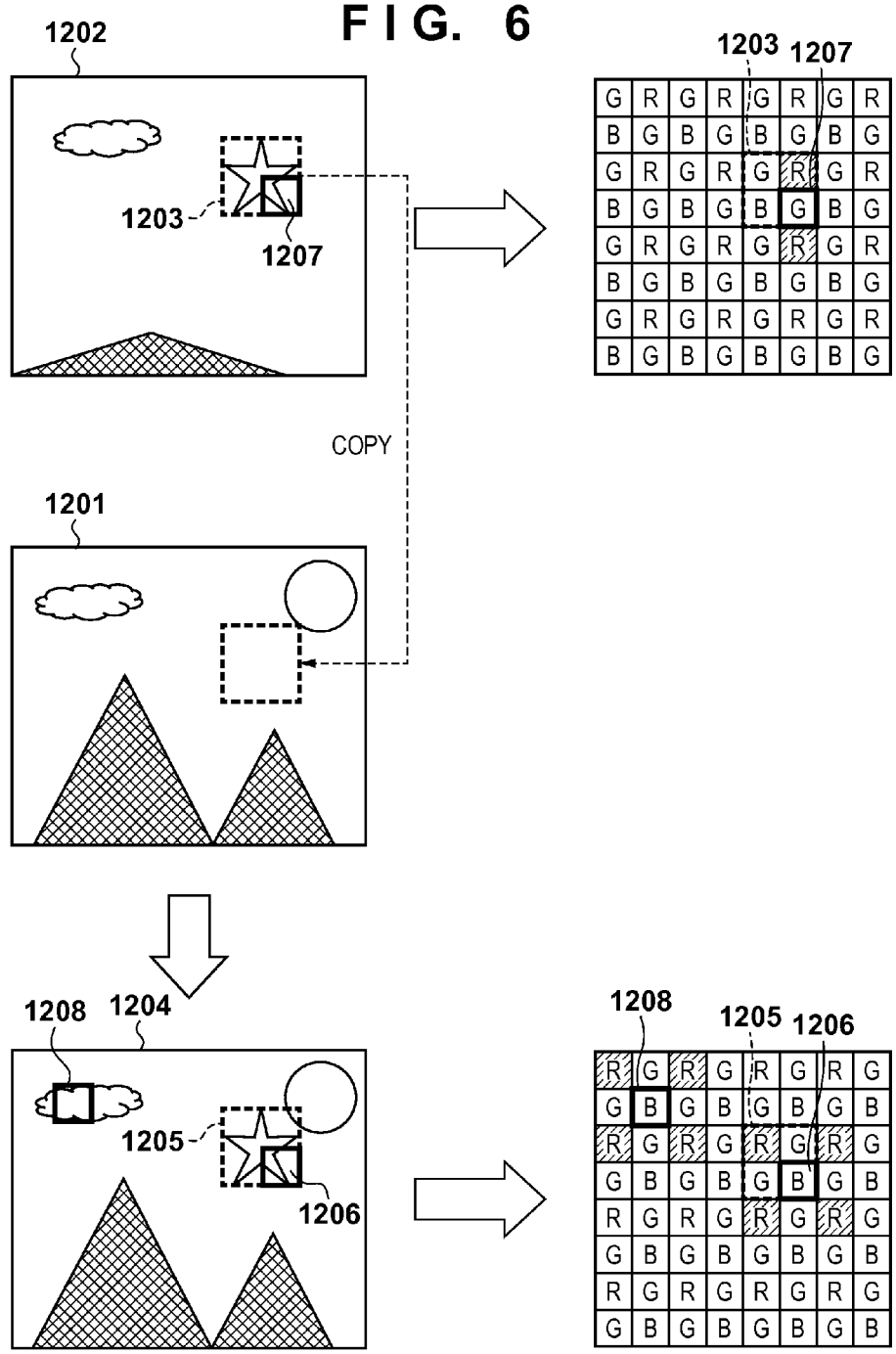
FIG. 6 is a view for explaining an example of alteration detection.

An example of alteration detection will be described below with reference to FIG. 6. Referring to FIG. 6, image data 1201 is source image data as an alteration target, image data 1202 is distinct image data used in alteration, and image data 1204 is altered image data. The altered image data 1204 generated by copying a partial region 1203 of the distinct image data 1202 to the source image data 1201 is input image data.

Assume that the source image data 1201 and distinct image data 1202 have different CFA patterns, and they use the same DMA in demosaicing. Therefore, a CFA pattern of the distinct image data 1202 is mixed in an altered region 1205 of the input image data 1204. That is, when re-demosaicing is applied to the input image data 1204 using the CFA pattern and DMA of the source image data 1201, pixel values of the altered region 1205 before and after re-demosaicing have differences.

For example, assume that a CFA pattern of the source image data 1201 is that shown in FIG. 3A, a DMA is bilinear interpolation, a CFA pattern of the distinct image data 1202 is that shown in FIG. 3C, and a DMA is bilinear interpolation. In this case, an R component of a pixel 1206 of the altered region 1205 is replaced by an average value of R components of four pixels, which neighbor upper left, upper right, lower left, and lower right positions of the pixel 1206, by re-demosaicing according to the CFA pattern shown in FIG. 3A and bilinear interpolation.

However, the altered region 1205 is a region copied from the partial region 1203 of the distinct image data 1202 which has undergone demosaicing according to not the CFA pattern shown in FIG. 3A but that shown in FIG. 3C. The R component before re-demosaicing of the pixel 1206 of the input image data 1204 (that of a pixel 1207 of the distinct image data 1202) assumes an average value of two R pixels which neighbor upper and lower positions of the pixel 1207. In the other words, the R component of the pixel 1206 of the altered region 1205 before re-demosaicing assumes an average value of R pixels of the pixel 1207, and that of the pixel 1206 after re-demosaicing assumes an average value of R components of four neighboring pixels of the pixel 1206. That is, the R components of the pixel 1206 before and after re-demosaicing have a difference, and the pixel 1206 is determined as a pixel which is altered (to be referred to as "altered pixel" hereinafter).

On the other hand, an R component of a pixel 1208 of the input image data 1204 assumes an average value of R pixels which neighbor upper left, upper right, lower left, and lower right positions before re-demosaicing, and also assumes an average value of R components of four pixels which neighbor upper left, upper right, lower left, and lower right positions after re-demosaicing. That is, the R component values of the pixel 1208 before and after re-demosaicing do not have a difference, and the pixel 1208 is determined as a pixel which is not altered (to be referred to as "non-alteration pixel" hereinafter).

Case of Identical CFA Pattern and Different DMAs

Figure 7:
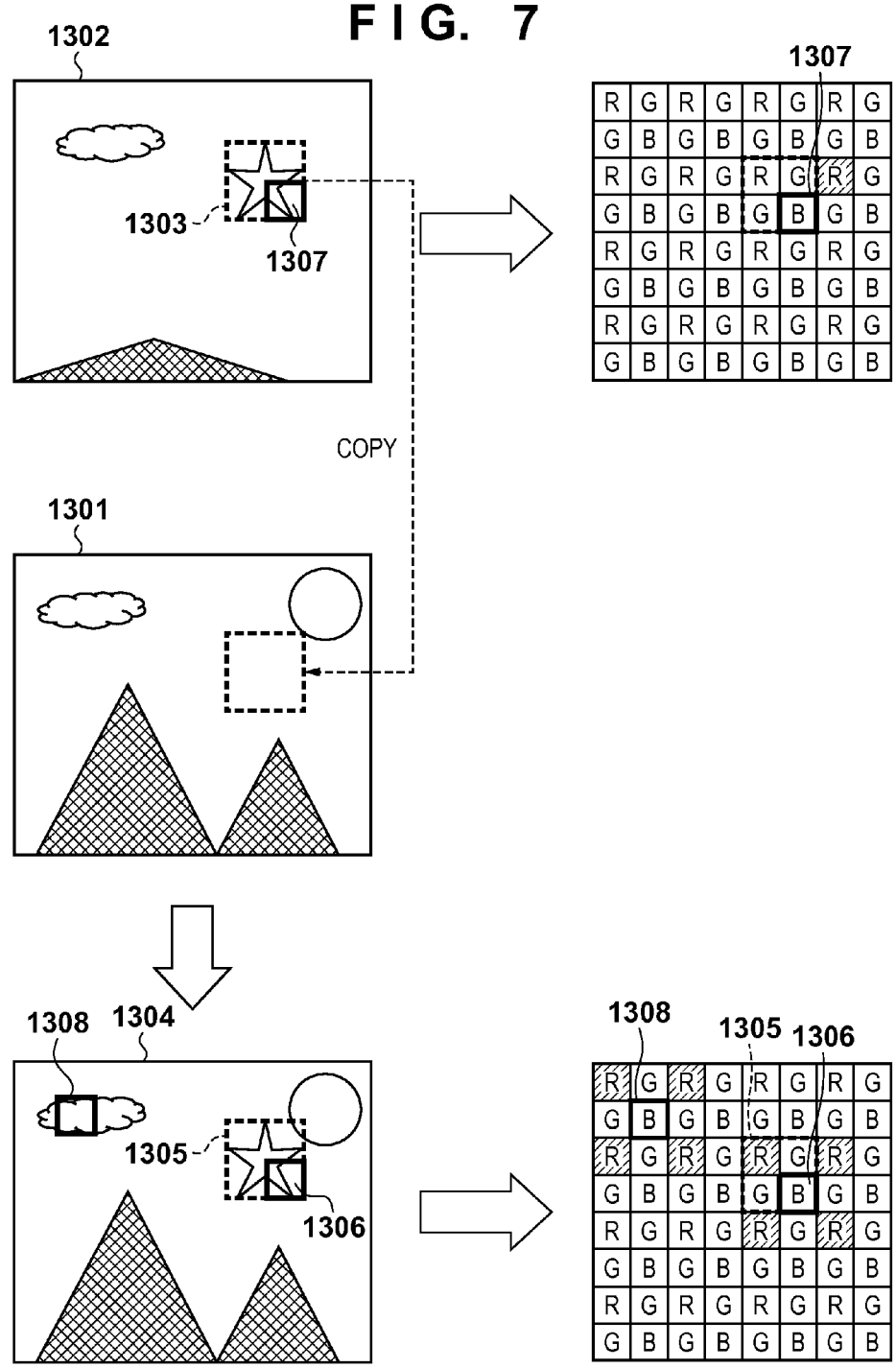
FIG. 7 is a view for explaining another example of alteration detection.

Another example of alteration detection will be described below with reference to FIG. 7. Referring to FIG. 7, image data 1301 is source image data as an alteration target, image data 1302 is distinct image data used in alteration, and image data 1304 is altered image data. The altered image data 1304 generated by copying a partial region 1303 of the distinct image data 1302 to the source image data 1301 is input image data.

Assume that the source image data 1301 and distinct image data 1302 have the same CFA pattern, and they use different DMAs in demosaicing. Therefore, pixels which have undergone demosaicing using the DMA of the distinct image data 1302 are mixed in an altered region 1305 of the input image data 1304. That is, when re-demosaicing is applied to the input image data 1304 using the CFA pattern and DMA of the source image data 1301, pixel values of the altered region 1305 before and after re-demosaicing have differences.

For example, assume that a CFA pattern of the source image data 1301 is that shown in FIG. 3A, a DMA is bilinear interpolation, a CFA pattern of the distinct image data 1302 is that shown in FIG. 3A, and a DMA is nearest neighbor interpolation. In this case, an R component of a pixel 1306 of the altered region 1305 is replaced by an average value of R components of four pixels, which neighbor upper left, upper right, lower left, and lower right positions of the pixel 1306, by re-demosaicing according to the CFA pattern shown in FIG. 3A and bilinear interpolation.

However, the altered region 1305 is a region copied from the partial region 1303 of the distinct image data 1302 which has undergone demosaicing according to not the bilinear interpolation but the nearest neighbor interpolation. The R component before re-demosaicing of the pixel 1306 of the input image data 1304 (that of a pixel 1307 of the distinct image data 1302) assumes a value of an upper right neighboring R pixel of the pixel 1307. In the other words, the R component of the pixel 1306 of the altered region 1305 before re-demosaicing assumes a value of a neighboring R pixel of the pixel 1307, and that of the pixel 1306 after re-demosaicing assumes an average value of R components of four pixels which neighbor the pixel 1306. That is, the R components of the pixel 1306 before and after re-demosaicing have a difference, and the pixel 1306 is determined as an altered pixel.

On the other hand, an R component of a pixel 1308 of the input image data 1304 assumes an average value of R pixels which neighbor upper left, upper right, lower left, and lower right positions before re-demosaicing, and also assumes an average value of R components of four pixels which neighbor upper left, upper right, lower left, and lower right positions after re-demosaicing. That is, R component values of the pixel 1308 before and after re-demosaicing do not have a difference, and the pixel 1308 is determined as a non-alteration pixel.

Case of Identical CFA Pattern and DMA

Figure 8:
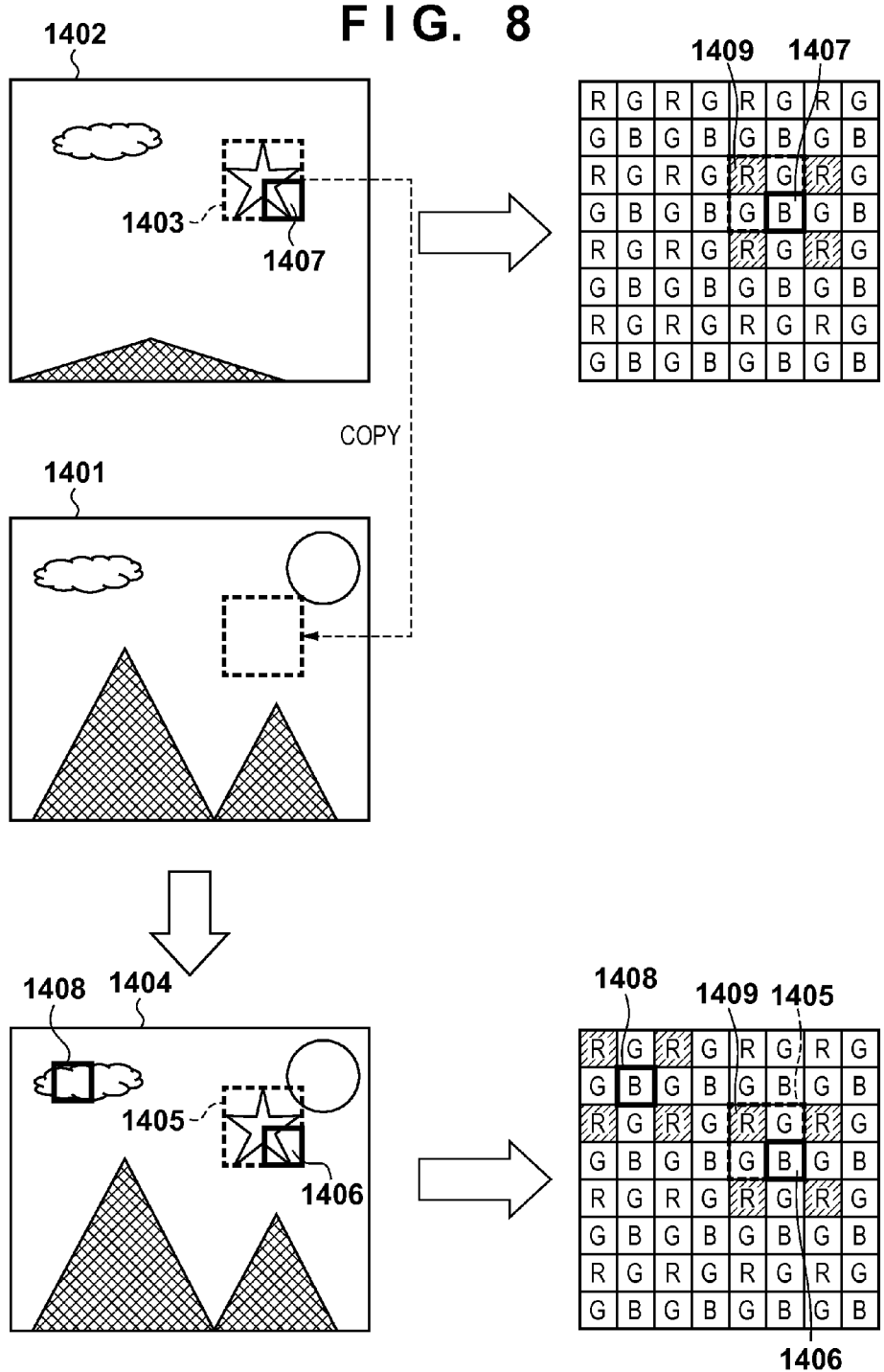
FIG. 8 is a view for explaining still another example of alteration detection.

Still another example of alteration detection will be described below with reference to FIG. 8. Referring to FIG. 8, image data 1401 is source image data as an alteration target, image data 1402 is distinct image data used in alteration, and image data 1404 is altered image data. The altered image data 1404 generated by copying a partial region 1403 of the distinct image data 1402 to the source image data 1401 is input image data.

Assume that the source image data 1401 and distinct image data 1402 use the same CFA pattern and DMA. However, assume that values of respective pixels in the vicinity of a boundary of the partial region 1403 of the distinct image data 1402 are different from those of respective pixels in the vicinity of a boundary of a partial region 1405 of the source image data 1401. In this case as well, values of pixels in the vicinity of the boundary of the altered region 1405 before and after re-demosaicing have differences.

For example, assume that a CFA pattern of the source image data 1401 and distinct image data 1402 is that shown in FIG. 3A, and a DMA is bilinear interpolation. In this case, an R component of a pixel 1406 of the altered region 1405 is replaced by an average value of R components of four pixels, which neighbor upper left, upper right, lower left, and lower right positions of the pixel 1406, by re-demosaicing according to the CFA pattern shown in FIG. 3A and bilinear interpolation.

On the other hand, an R component of the pixel 1406 of the altered region 1405 before re-demosaicing (that of a pixel 1407 of the distinct image data 1402) assumes an average value of four R pixels which neighbor upper left, upper right, lower left, and lower right positions of the pixel 1407. Of these neighboring pixels, an upper left neighboring pixel 1409 is included in the copied partial region 1403, and assumes the same value in the distinct image data 1402 and input image data 1404. However, the three remaining pixels are not included in the partial region 1403, and assume different values in the distinct image data 1402 and input image data 1404. As a result, an average value of values of pixels used in demosaicing is different from that of values of pixels used in re-demosaicing, and R components of the pixel 1406 before and after re-demosaicing have a difference. Hence, the pixel 1406 is determined as an altered pixel.

On the other hand, an R component of a pixel 1408 of the input image data 1404 assumes an average value of R pixels which neighbor upper left, upper right, lower left, and lower right positions before re-demosaicing, and also assumes an average value of R components of four pixels which neighbor upper left, upper right, lower left, and lower right positions after re-demosaicing. That is, R components of the pixel 1408 before and after re-demosaicing do not have a difference, and the pixel 1408 is determined as a non-alteration pixel.

The example of alteration in which a partial region of distinct image data is copied to source image data (external copy) has been described. Also, alteration in which a partial region of image data is copied to another position of the identical image data (internal copy) can be detected. That is, even in identical image data, since CFA patterns are deviated depending on positions of a copy-source region and copy-destination region, and pixels used in interpolation in demosaicing are different in the copy-source region and copy-destination region, alteration can be detected.

[Alteration Detection Processing]

Alteration detection processing will be described below with reference to the flowchart shown in FIG. 9.

The image input unit 201 inputs image data (S301). The CFA pattern obtaining unit 202 obtains CFA pattern information from metadata of the input image data (S302). The DMA obtaining unit 203 extracts, from the metadata of the input image data, information indicating a camera, which was used to photograph and generate the image data, and obtains DMA information upon demosaicing of the input image data with reference to the DB 801 or the like (S303).

The comparative image generation unit 204 generates comparative image data by applying re-demosaicing to the input image data based on the obtained CFA pattern information and DMA information (S304). The alteration detection unit 205 compares the input image data and comparative image data to detect an altered region of the input image data (S305). Then, the output unit 206 outputs the detection result of the alteration detection unit 205 (S306).

In this way, comparative image data generated by applying re-demosaicing to input image data based on CFA pattern information and DMA information of source image data obtained from metadata of input image data is used. Thus, the detection percentage (detection precision) in alteration detection of image data can be raised.

Second Embodiment

Image processing according to the second embodiment of the present invention will be described below. Note that the same reference numerals in the second embodiment denote the same components as those in the first embodiment, and a detailed description thereof will not be repeated.

The second embodiment which estimates a DMA and executes alteration detection under the assumption that CFA pattern information can be obtained from metadata of image data but DMA information cannot be obtained will be described below. That is, when a DMA cannot be specified from photography camera information obtained from metadata, a DMA used in demosaicing of input image data is estimated using obtained CFA pattern information and the input image data. Then, based on the estimated DMA, re-demosaicing is applied to detect alteration as in the first embodiment.

The functional arrangement of the second embodiment is the same as that of the first embodiment, but some functions of a CFA pattern obtaining unit 202 and DMA obtaining unit 203 are different from the first embodiment.

Estimation of DMA

When DMA information cannot be obtained, the DMA obtaining unit 203 generates comparative image data based on a DMA candidate and CFA pattern information, estimates a DMA by comparing the comparative image data and input image data, and stores the estimated DMA in a predetermined area of a memory 103, HDD 107, or the like. Note that as a DMA candidate, for example, a DMA included in a DB 801 may be used, or the user may directly designate a DMA candidate.

When DMA candidates are set, a comparative image generation unit 204 generate comparative image data of the respective DMA candidates. The DMA obtaining unit 203 estimates a DMA candidate used to generate comparative image data which is most approximate to input image data as a DMA of the input image data. Note that comparison between the input image data and comparative image data uses that between pixel values for respective pixels or that between feature amounts for respective unit blocks as in the first embodiment.

For example, an absolute sum of differences of pixel values for respective pixels between input image data and comparative image data or that of differences of feature amounts for respective unit blocks is calculated, and a DMA candidate used to generate comparative image data, the absolute sum of differences of which is smaller than a predetermined threshold, is estimated as a DMA of the input image data. In some cases, a plurality of comparative image data, the absolute sum of differences of which is smaller than the threshold, may be generated, or no comparative image data, the absolute sum of differences of which is smaller than the threshold, may be generated. In such case, a DMA candidate used to generate comparative image data having the smallest absolute sum of differences may be estimated as a DMA of the input image data.

By comparing the absolute sum of differences and the threshold, a DMA candidate which is not approximate to a DMA used in demosaicing of input image data can be excluded purposely. In other words, by excluding a DMA with low estimation precision from alteration detection by determination using the threshold, detection errors can be prevented. Note that an average value or median of absolute values of differences may be used in place of the absolute sum of differences.

CFA Pattern-Based Alteration Detection

The CFA pattern obtaining unit 202 has a function for CFA pattern-based alteration detection in addition to the functions of the first embodiment. That is, the CFA pattern obtaining unit 202 also obtains second CFA patterns (to be referred to as "distinct CFA patterns" hereinafter) which are different from a first CFA pattern (to be referred to as "obtained CFA pattern" hereinafter) indicated by CFA pattern information obtained from metadata. For example, when the obtained CFA pattern is that shown in FIG. 3A, distinct CFA patterns include three patterns shown in FIGS. 3B, 3C, and 3D.

Using the obtained CFA pattern and distinct CFA patterns, CFA pattern-based alteration detection can be executed. The CFA pattern-based alteration detection executes alteration detection by attaching more importance on CFA pattern differences than on DMA differences. For example, when there are only comparative image data, the absolute sum of differences of which is not less than the threshold, as a result of DMA estimation of the DMA obtaining unit 203, it is desirable to switch to the CFA pattern-based alteration detection. A DMA candidate used to generate comparative image data, the absolute sum of differences of which is not less than the threshold, is more likely to be different from a DMA used in demosaicing of input image data, and alteration detection using such DMA candidate suffers a high possibility of detection errors. In such case, the CFA pattern-based alteration detection is effective.

The CFA pattern-based alteration detection is attained by extraction of an alteration candidate region using the obtained CFA pattern and selection of an altered region from the alteration candidate region using the distinct CFA patterns. The alteration candidate region is a region which is more likely to have a CFA pattern different from the obtained CFA pattern. For example, when the obtained CFA pattern is that shown in FIG. 3A, the alteration candidate region is a region which is more likely to have a CFA pattern shown in FIG. 3B, 3C, or 3D. More specifically, a set of altered pixels detected by an alteration detection unit 205 by comparison between comparative image data generated by re-demosaicing using the obtained CFA pattern and estimated DMA and the input image data is an alteration candidate region. Alternatively, a set of altered blocks or a region surrounded by altered pixels or blocks may be determined as an alteration candidate region.

The CFA pattern obtaining unit 202 controls the comparative image generation unit 204 and alteration detection 205 to compare comparative image data generated from image data of the alteration candidate region by re-demosaicing using a distinct CFA pattern with image data of the alteration candidate region of the input image data. Then, the CFA pattern obtaining unit 202 selects only a region with a high possibility of alteration from the alteration candidate region.

Note that comparative image data generated from image data of an alteration candidate region will also be expressed as "comparative image data generated from an alteration candidate region" in the following description. Also, comparison between comparative image data generated from image data of an alteration candidate region and image data of the alteration candidate region of input image data will also be expressed as "comparison between comparative image data generated from an alteration candidate region and input image data".

As described above, an alteration candidate region approximate to comparative image data generated using the distinct CFA pattern is more likely to be a region having a CFA pattern different from the obtained CFA pattern. This is caused by a characteristic with which comparative image data generated by re-demosaicing using a CFA pattern and DMA of input image data includes image components approximate to the input image data, as described above in the first embodiment.

Using the above characteristic, from an alteration candidate region extracted using the obtained CFA pattern (for example, FIG. 3A), the distinct CFA pattern (for example, FIG. 3B) can be used to select a partial region (altered region) having that CFA pattern. That is, a partial region of input image data, which is approximate to comparative image data generated from an alteration candidate region using the distinct CFA pattern, is more likely to be an altered region having the distinct CFA pattern. In other words, the partial region is more likely to be an altered region having a CFA pattern different from that of source image data.

Likewise, an alteration candidate region having a CFA pattern of FIG. 3C or 3D can be selected as an altered region. Since an altered region is selected using not only the obtained CFA pattern but also the distinct CFA pattern, detection errors of a non-alteration region as an altered region can be reduced. Note that in approximation determination of an alteration candidate region of input image data and comparative image data generated from the alteration candidate region, for example, when an absolute sum of differences of pixel values of these regions is not more than a predetermined threshold, it may be determined that they are approximate to each other; when the absolute sum of differences exceeds the threshold, it may be determined that they are not approximate to each other. Note that an average value or median of absolute values of differences may be used in place of the absolute sum of differences.

[Alteration Detection Processing]

Figure 10A:
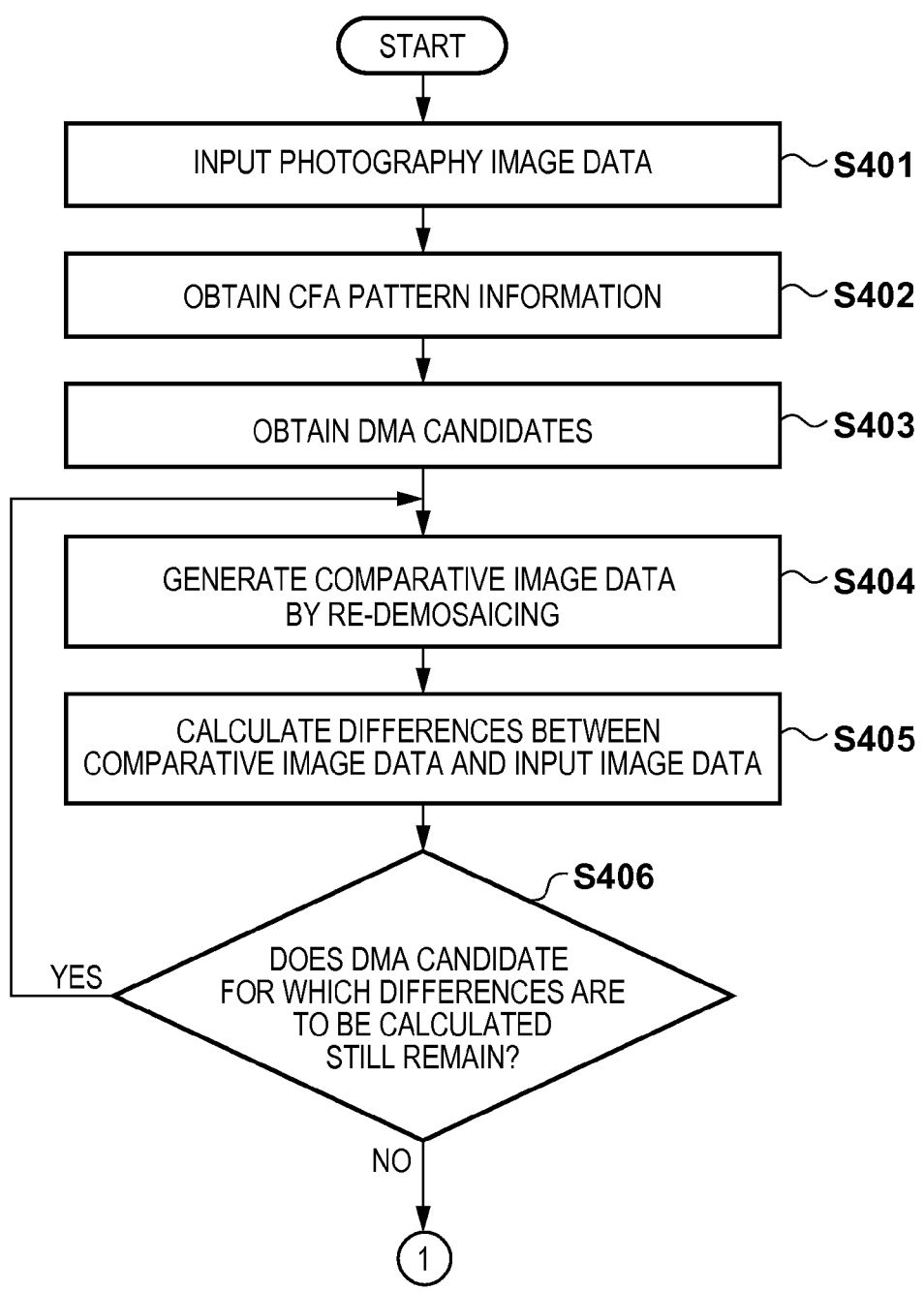
FIGS. 10A and 10B are flowcharts for explaining alteration detection processing according to the second embodiment.

Alteration detection processing according to the second embodiment will be described below with reference to the flowcharts shown in FIGS. 10A and 10B.

An image input unit 201 inputs image data of a photography image (S401). The CFA pattern obtaining unit 202 obtains CFA pattern information from metadata of the input image data (S402). The DMA obtaining unit 203 obtains DMA candidates with reference to metadata of the input image data and the DB 801 (S403).

The DMA obtaining unit 203 controls the comparative image generation unit 204 to generate comparative image data from the input image data by re-demosaicing based on the obtained CFA pattern and one of the obtained DMA candidates (S404). Furthermore, the DMA obtaining unit 203 controls the alteration detection unit 205 to calculate differences between the comparative image data and input image data (S405). Then, the DMA obtaining unit 203 determines whether or not differences between comparative image data and the input image data are calculated for all of obtained DMA candidates (S406). If DMA candidates for which differences are to be calculated still remain, the process returns to step S404 to calculate differences based on the next DMA candidate.

After differences between the input image data and comparative image data are calculated for all the DMA candidates, the DMA obtaining unit 203 determines whether or not comparative image data, the absolute sum of differences of which is smaller than a predetermined threshold, is generated (S407). If comparative image data, the absolute sum of differences of which is smaller than the threshold, is generated, a DMA candidate used to generate that comparative image data can be decided as a DMA of the input image data.

When the DMA is decided, the comparative image generation unit 204 generates comparative image data by re-demosaicing based on the obtained CFA pattern and decided DMA (S408). The alteration detection unit 205 executes alteration detection by comparing the generated comparative image data and input image data (S409), and an output unit 206 outputs the alteration detection result (S414).

When there is no DMA candidate corresponding to the absolute sum of difference, which is smaller than the threshold, and a DMA is not decided, the CFA pattern obtaining unit 202 executes the CFA pattern-based alteration detection. That is, the CFA pattern obtaining unit 202 controls the comparative image generation unit 204 to generate comparative image data by re-demosaicing based on a DMA candidate (to be referred to as "temporary DMA" hereinafter) used to generate comparative image data, the absolute sum of differences from the obtained CFA pattern of which is smallest (S410). Furthermore, the CFA pattern obtaining unit 202 controls the alteration detection unit 205 to extract an alteration candidate region by comparing the comparative image data and input image data (S411).

Next, the CFA pattern obtaining unit 202 controls the comparative image generation unit 204 to generate comparative image data from the alteration candidate region by re-demosaicing based on the distinct CFA pattern and temporary DMA (S412). Furthermore, the CFA pattern obtaining unit 202 controls the alteration detection unit 205 to detect an altered region by comparing the comparative image data generated in step S412 and the alteration candidate region (S413). Note that the CFA pattern obtaining unit 202 repeats the processes of steps S412 and S413 until an altered region is detected for all the distinct CFA patterns. Upon completion of detection of an altered region for all the distinct CFA patterns, the output unit 206 detects the detection result of the altered region (S414).

In this manner, when DMA information cannot be obtained, a DMA can be estimated. Furthermore, when the estimation precision of a DMA is low, the alteration detection method is switched to the CFA pattern-based alteration detection, and an altered region having a CFA pattern different from that of input image data can be detected with high precision.

First Modification

The first modification which improves the DMA estimation precision by estimating a DMA on the parameter level will be described below.

In the second embodiment, an optimal DMA is estimated from a plurality of DMA candidates. Furthermore, interpolation parameters of the estimated DMA can be adjusted. The interpolation parameters of the DMA include a pixel range used in interpolation (to be referred to as "interpolation pixel range" hereinafter), a calculation method of an average value of pixel values, and the like.

For example, the first embodiment has explained bilinear interpolation using four pixels which neighbor upper left, upper right, lower left, and lower right positions as an interpolation pixel range. That is, a range of 3×3 pixels having a pixel of interest to be interpolated as the center is an interpolation pixel range. This interpolation pixel range can be extended to 5×5 pixels. That is, "3×3 pixels" and "5×5 pixels" can be used as the interpolation pixel range as an interpolation parameter.

As an average value of pixel values, a weighted average calculated by weighting specific pixels may be calculated. As described, a DMA itself may be the same but interpolation parameters may be different in some cases. Therefore, by estimating a DMA in consideration of interpolation parameter differences, the DMA estimation precision can be improved, and the alteration detection percentage can be raised.

The DMA estimation processing of the first modification will be described below with reference to the flowchart shown in FIG. 11. Note that the processing shown in FIG. 11 is executed in place of step S407 shown in FIG. 10B.

After it is determined that differences between input image data and comparative image data of all DMA candidates are calculated (S406), the DMA obtaining unit 203 selects a DMA candidate used in re-demosaicing of comparative image data, the absolute sum of differences of which is smallest, as a DMA of the input image data (S421).

Next, the DMA obtaining unit 203 changes an interpolation parameter (interpolation pixel range or the like) of the selected DMA (S422). Then, the DMA obtaining unit 203 controls the comparative image generation unit 204 to generate comparative image data by re-demosaicing based on the obtained CFA pattern and the selected DMA (to be referred to as "selected DMA" hereinafter), the interpolation parameter of which is changed (S423). Furthermore, the DMA obtaining unit 203 controls the alteration detection unit 205 to calculate differences of pixel values between the comparative image data and input image data (S424).

The DMA obtaining unit 203 repeats the processes of steps S422 to S424 until it is determined in step S425 that no interpolation parameter to be changed remains. Then, the DMA obtaining unit 203 decides interpolation parameters used to generate comparative image data, the absolute sum of differences of which is smallest, as those of the selected DMA (S426). Then, the DMA obtaining unit 203 determines whether or not the absolute sum of differences related to the comparative image data generated based on the selected DMA of the decided interpolation parameters is smaller than a threshold (S427).

If it is determined in step S427 that the absolute sum of differences is smaller than the threshold, the alteration detection (S408-S409) is executed; otherwise, the CFA pattern-based alteration detection (S410-S413) is executed.

Second Modification

The second modification which switches processing according to required specs of the processing speed of the alteration detection processing and the alteration detection percentage will be described below. More specifically, the processes of steps S410 to S413 shown in FIG. 10B are switched according to the required specs.

For example, when detection percentage can be low but a high processing speed is required, an alteration candidate region extracted in step S411 is determined as a final alteration detection result, and the subsequent processes of steps S412 and S413 are skipped. By skipping the processes of steps S412 and S413, a high processing speed can be assured, but since the alteration detection related to distinct CFA patterns different from the obtained CFA pattern is skipped, the detection percentage lower.

On the other hand, for example, when middle detection percentage and processing speed are required, the alteration detection processing in steps S410 to S413 is executed.

Also, for example, when a long processing time is allowed but high detection percentage are required, the processes of steps S410 and S411 are skipped, and those of steps S412 and S413 are executed. In this case, since comparative image data is generated by re-demosaicing based on each of the distinct CFA patterns and temporary DMA for the entire input image data in place of an alteration candidate region, a long processing time is required. Since an alteration candidate region is extracted based on the obtained CFA pattern, an altered region which is not detected as an alteration candidate region may remain. By contrast, when the alteration detection based on the distinct CFA pattern is executed for the entire input image data, a problem of an altered region which is not detected as an alteration candidate region can be avoided, and the alteration detection percentage is likely to be raised.

Note that the user can set, for example, any of three stages "high-speed processing/low detection percentage", "middle-speed processing/middle detection percentage", and "low-speed processing/high detection percentage" using the input device 109 as the required specs of processing speed and detection percentage.

Figure 12:
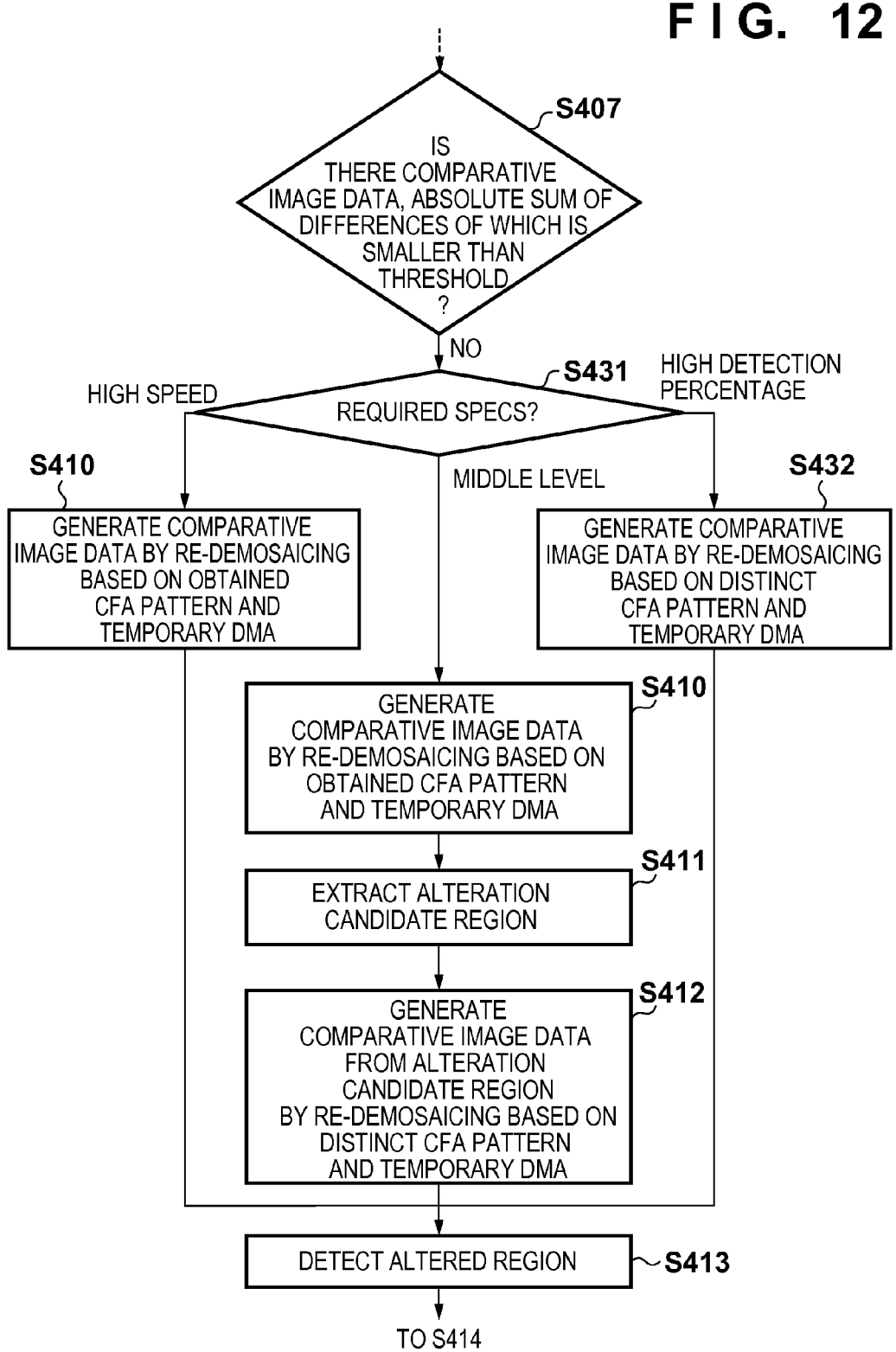
FIG. 12 is a flowchart for explaining processing for switching processing according to required specs according to the second modification.

The processing for switching processing according to the required specs according to the second modification will be described below with reference to the flowchart shown in FIG. 12. Note that the processing shown in FIG. 12 is executed in place of steps S410 to S413 shown in FIG. 10B.

If there is no DMA candidate corresponding to the absolute sum of differences, which is smaller than the threshold, and a DMA is not decided (S407), the CFA pattern obtaining unit 202 determines required specs (S431).

When the required specs indicate, for example, high-speed processing like "high-speed processing/low detection percentage", comparative image data is generated from the input image data by re-demosaicing based on the obtained CFA pattern and temporary DMA (S410). Then, an altered region is detected by comparing the comparative image data and input image data (S413).

Figure 10B:
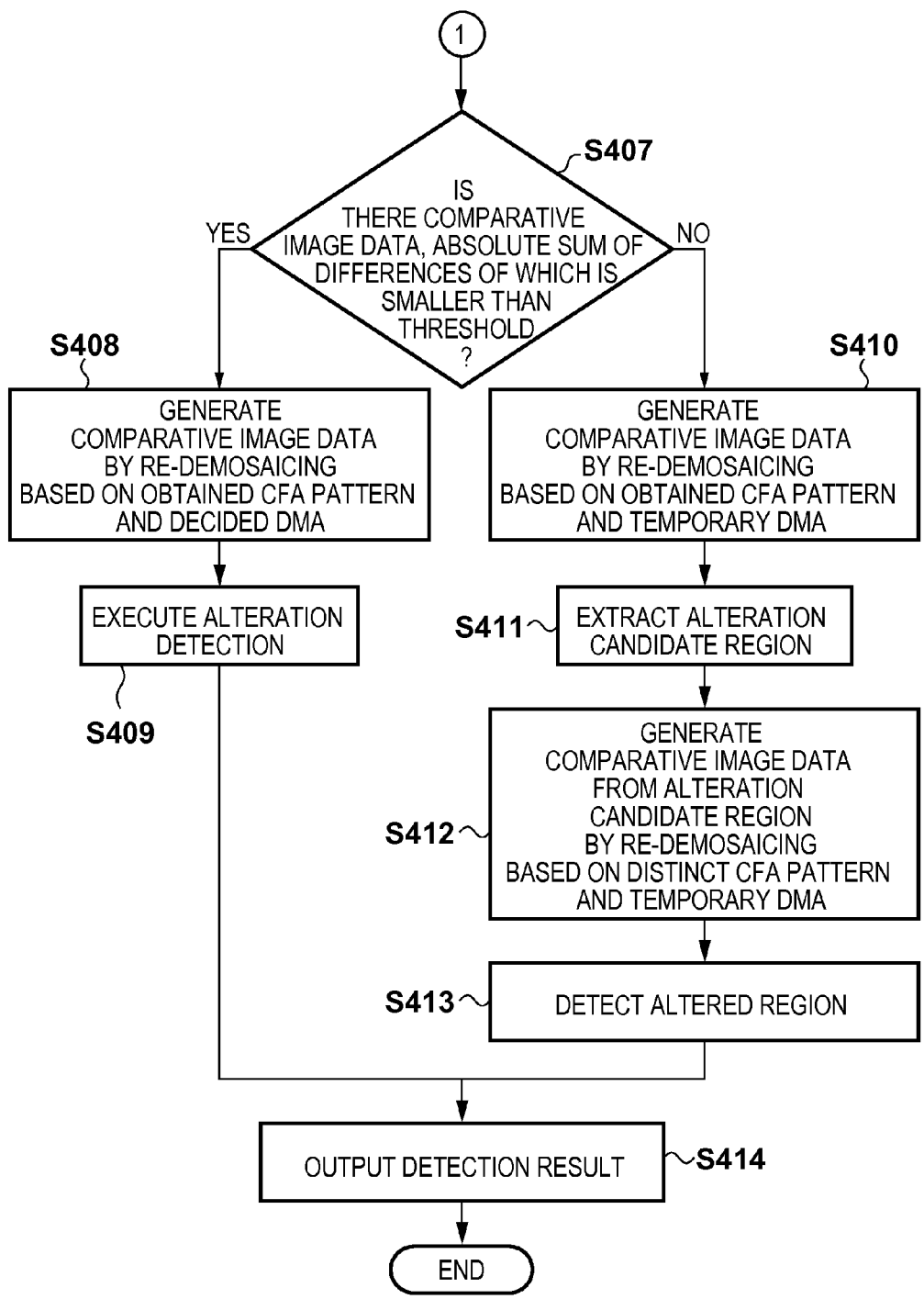
Figure 11:
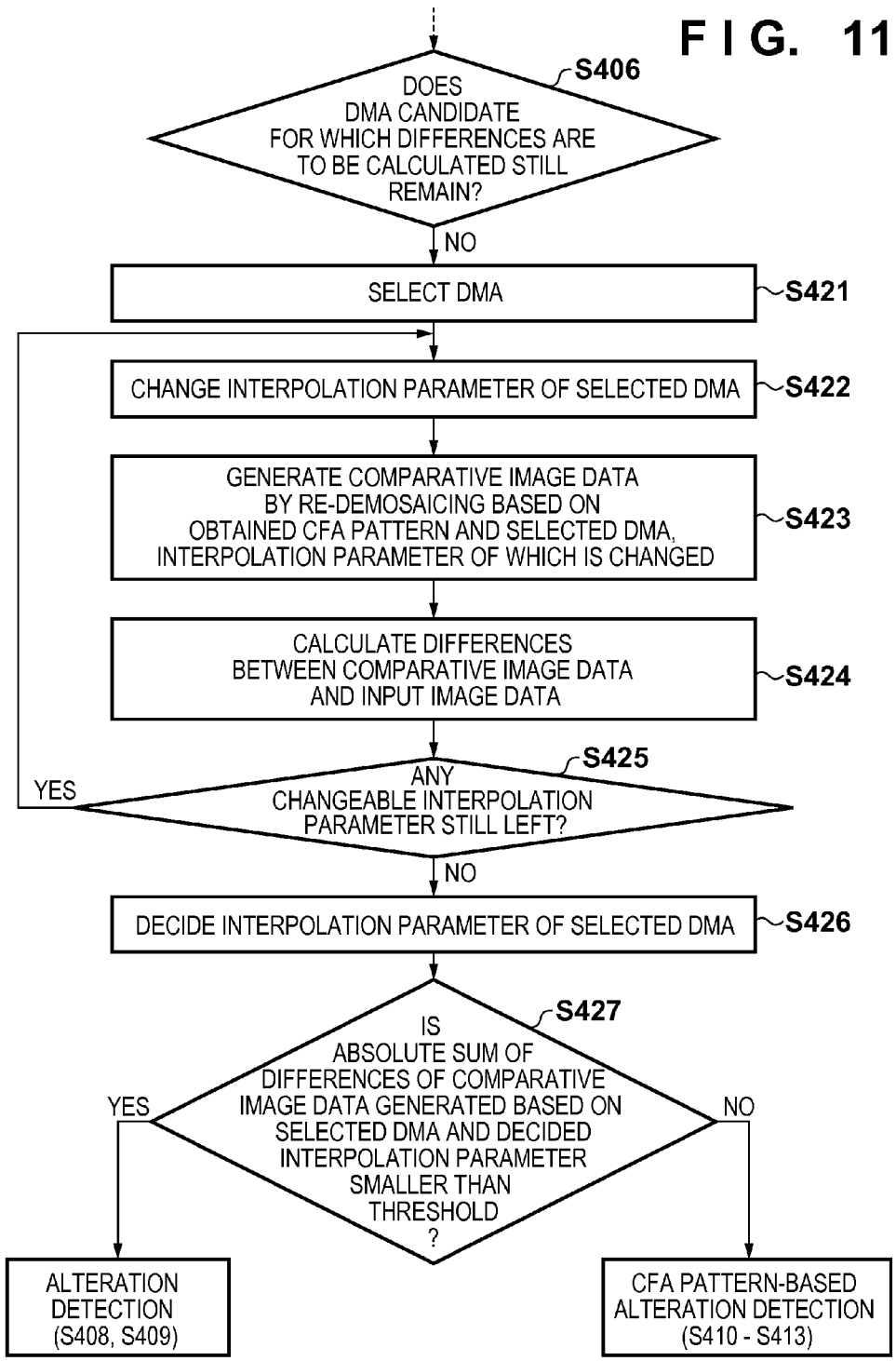
FIG. 11 is a flowchart for explaining DMA estimation processing according to the first modification.

On the other hand, when the required specs indicate, for example, a middle level like "middle-speed processing/ middle detection percentage", the same processing (S410-S413) as that in the description using FIG. 10B is executed.

Also, when the required specs indicate, for example, high detection percentage like "low-speed processing/high detection percentage", comparative image data is generated from the input image data by re-demosaicing based on the distinct CFA pattern and temporary DMA (S432). Then, an altered region is detected by comparing the comparative image data and input image data (S413). Note that the CFA pattern obtaining unit 202 repeats the processes of steps S432 and S413 until an altered region is detected for all the distinct CFA patterns.

Third Embodiment

Image processing according to the third embodiment of the present invention will be described below. Note that the same reference numerals in the third embodiment denote the same components as those in the first and second embodiments, and a detailed description thereof will not be repeated.

The third embodiment which executes alteration detection by estimating a CFA pattern under the assumption that DMA information can be obtained but CFA pattern information cannot be obtained will be described below. That is, when a CFA pattern cannot be specified from photography camera information obtained from metadata of image data, a CFA pattern of that image data is estimated using the obtained DMA information and input image data. Then, re-demosaicing is executed to detect alteration based on the estimated CFA pattern, as in the first and second embodiments.

The functional arrangement of the third embodiment is the same as that of the first embodiment, but some functions of a CFA pattern obtaining unit 202 are different from the first embodiment.

Estimation of CFA Pattern

When CFA pattern information cannot be obtained, the CFA pattern obtaining unit 202 estimates a CFA pattern by comparing comparative image data generated based on a CFA pattern candidate and DMA information and input image data. Then, the CFA pattern obtaining unit 202 stores the estimated CFA pattern in a predetermined area of a memory 103, HDD 107, or the like. Note that a CFA pattern candidate includes, for example, CFAs shown in FIGS. 3A to 3E and the like.

When CFA pattern candidates are set, a comparative image generation unit 204 generates comparative image data for respective CFA pattern candidates. The CFA pattern obtaining unit 202 estimates a CFA pattern candidate used to generate comparative image data which is most approximate to the input image data as a CFA pattern of the input image data. Note that comparison between the input image data and comparative image data uses that between pixel values for respective pixels or that between feature amounts for respective unit blocks as in the first embodiment.

For example, an absolute sum of differences of pixel values for respective pixels of input image data and comparative image data or that of differences of feature amounts for respective unit blocks is calculated. Then, a CFA pattern candidate used to generate comparative image data, the absolute sum of differences of which is smallest, is estimated as a CFA pattern of the input image data. Note that an average value or median of absolute values of differences may be used in place of the absolute sum of differences.

[Alteration Detection Processing]

Figure 13:
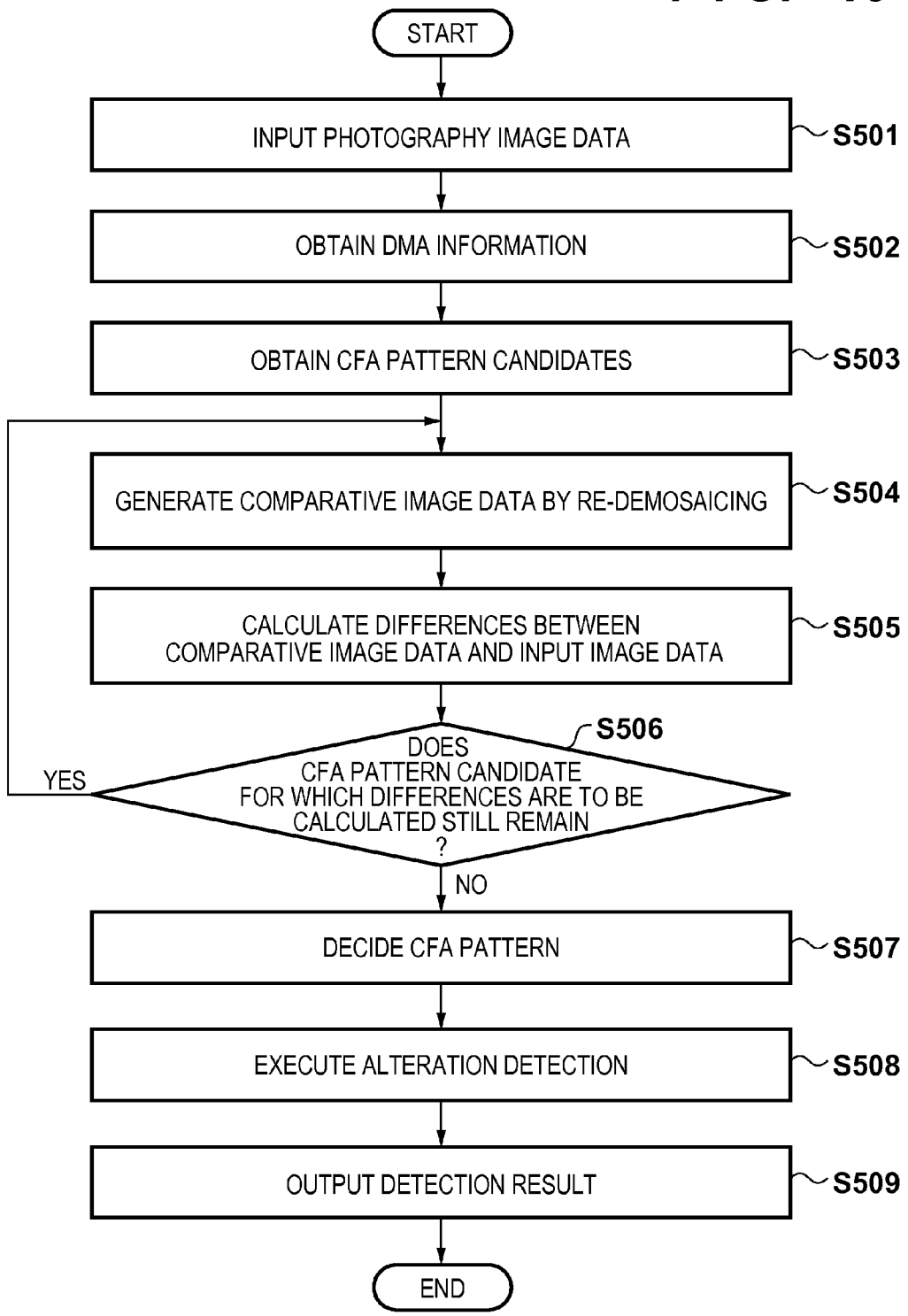
FIG. 13 is a flowchart for explaining alteration detection processing according to the third embodiment.

Alteration detection processing according to the third embodiment will be described below with reference to the flowchart shown in FIG. 13.

An image input unit 201 inputs image data of a photography image (S501). A DMA obtaining unit 203 obtains DMA information with reference to metadata of the input image data, a DB 801, and the like (S502). The CFA pattern obtaining unit 202 obtains CFA pattern candidates (S503).

The CFA pattern obtaining unit 202 controls the comparative image generation unit 204 to generate comparative image data from the input image data by re-demosaicing based on one CFA pattern candidate and the obtained DMA information (S504). Furthermore, the CFA pattern obtaining unit 202 controls an alteration detection unit 205 to calculate differences between the comparative image data and input image data (S505). Then, the CFA pattern obtaining unit 202 determines whether or not differences between the comparative image data and input image data are calculated for all of the obtained CFA pattern candidates (S506). If CFA pattern candidates for which differences are to be calculated still remain, the process returns to step S504 to calculate differences based on the next CFA pattern candidate.

After differences between the input image data and comparative image data are calculated for all the CFA pattern candidates, the CFA pattern obtaining unit 202 detects comparative image data corresponding to the smallest absolute sum of differences. Then, the CFA pattern obtaining unit 202 decides a CFA pattern candidate used to generate that comparative image data as a CFA pattern of the input image data (S507).

The alteration detection unit 205 executes alteration detection by comparing the comparative image data generated using the decided CFA pattern and the input image data (S508), and an output unit 206 outputs the alteration detection result (S509).

In this manner, when CFA pattern information cannot be obtained, a CFA pattern can be estimated.

Third Modification

The third modification which estimates a CFA pattern for respective RGB component arrangements will be described below.

Initially, an arrangement of G pixels in a CFA pattern is estimated, and arrangements of R and B pixels are then estimated. For example, CFAs of Bayer arrangements shown in FIGS. 3A to 3D are classified into a first group (FIGS. 3A and 3B) in which G pixels are arranged at lower left and upper right positions and a second group (FIGS. 3C and 3D) in which G pixels are arranged at upper left and lower right positions, depending on the arrangement of G pixels.

Comparison between comparative image data generated using CFA patterns of the first group and input image data, and that between comparative image data generated using CFA patterns of the second group and the input image data are executed to estimate a group to which a CFA pattern of the input image data belongs. Since an arrangement of G pixels need only be estimated, comparison is executed while focusing attention on only G components of the input image data and comparative image data. That is, the arrangement of G pixels of a group used to generate comparative image data having G components approximate to those of the input image data is estimated as that of G pixels of the CFA pattern of the input image data.

Next, in order to estimate the arrangements of R and B pixels, R and B components of the input image data and comparative image data need only be compared. For example, when a CFA pattern which belongs to the first group is estimated, comparative image data is generated using each of the CFA patterns shown in FIGS. 3A and 3B, and whether or not R and B components of the input image data and comparative image date are approximate to each other is determined. Then, the arrangements of R and B pixels of a CFA pattern used to generate more approximate comparative image data are estimated as those of R and B pixels of a CFA pattern of the input image data.

As described above, the arrangements of RGB pixels are estimated, and the CFA pattern of the input image data is decided. Since comparison of RGB components of the input image data and comparative image data is executed step by step according to the arrangements of RGB pixels of CFA patterns, the estimation precision can be improved more than estimation of a CFA pattern by comparing RGB components at once.

Upon comparison of G components, an average value of absolute values of differences between G components of comparative image data generated using a CFA pattern which belongs to each group and those of the input image data can also be used. For example, differences between G components of comparative image data generated using the CFA pattern shown in FIG. 3A and those of the input image data are calculated. Furthermore, differences between G components of comparative image data generated using the CFA pattern shown in FIG. 3B and those of the input image data are calculated. Then, an average value of the absolute values of these differences is determined as a difference of G components of the first group. Likewise, a difference of G components is calculated for the second group, and by comparing the differences of G components of the two groups, the arrangement of G pixels of the CFA pattern of the input image data can be estimated.

Figure 14A:
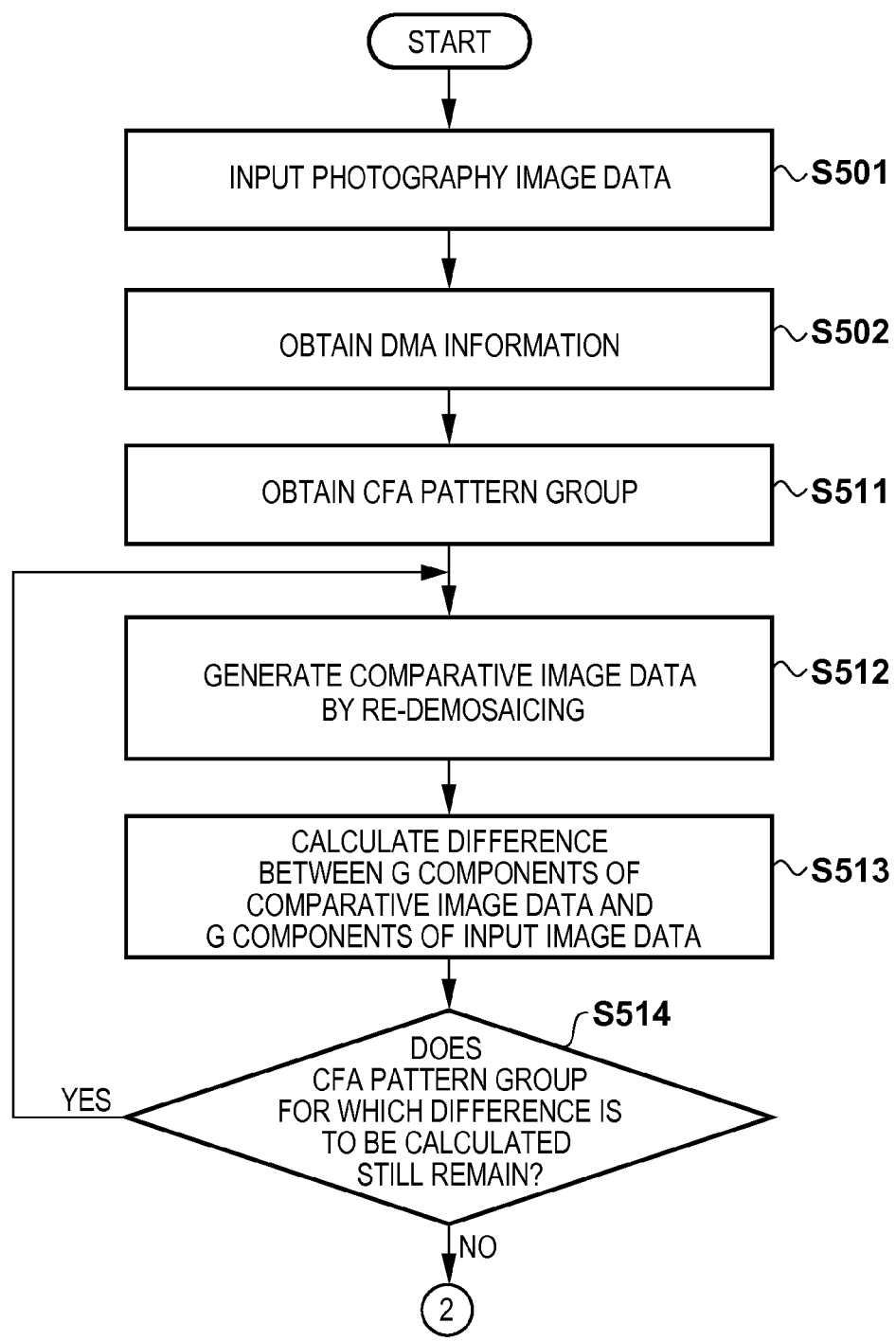
FIGS. 14A and 14B are flowcharts for explaining alteration detection processing including CFA pattern estimation processing according to the third modification.
Figure 14B:
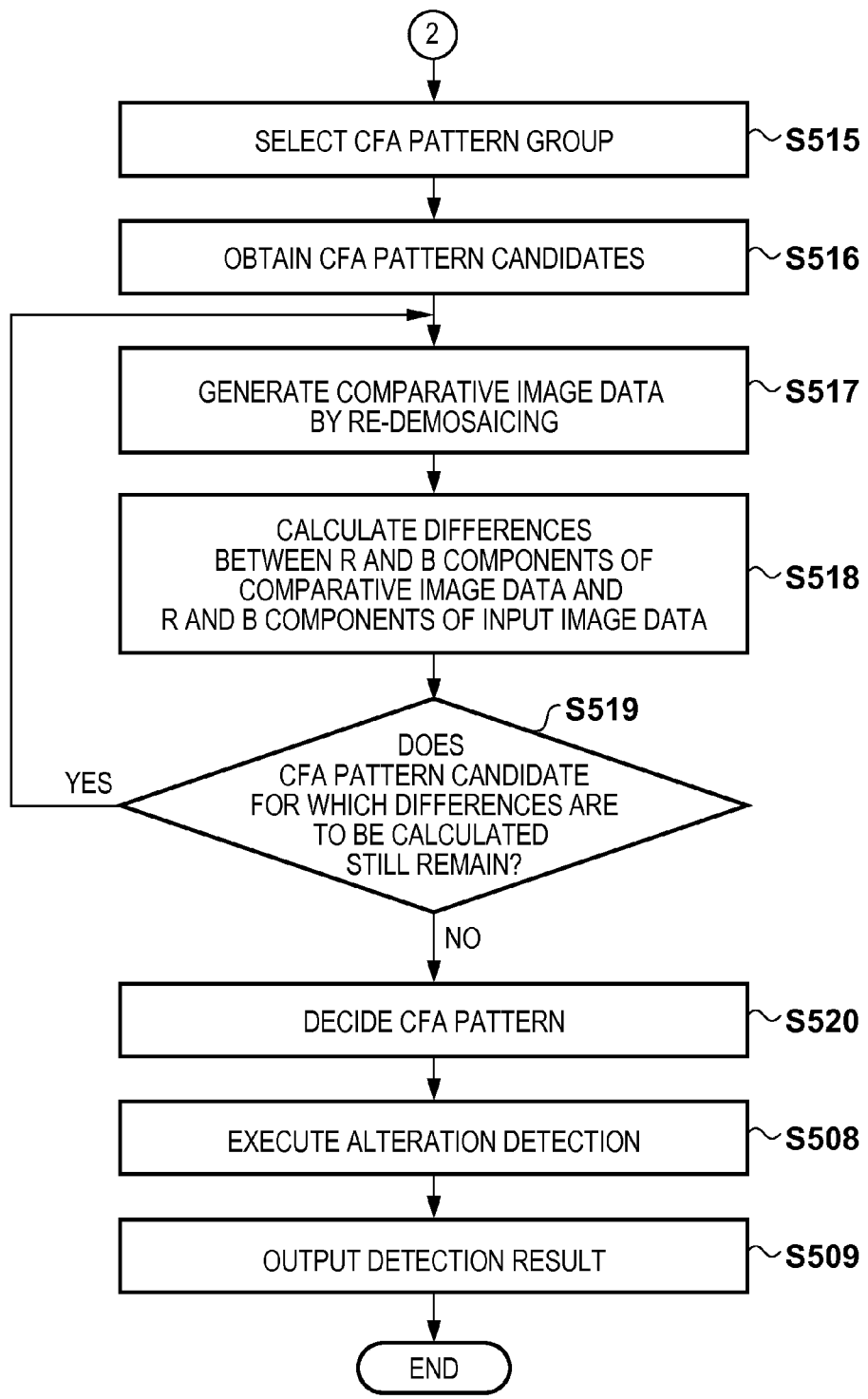

Alteration detection processing including CFA pattern estimation processing according to the third modification will be described below with reference to the flowcharts shown in FIGS. 14A and 14B. Note that the processes of steps S501, S502, S508, and S509 are the same as those in FIG. 13, and a detailed description of these processes will not be repeated.

The CFA pattern obtaining unit 202 obtains CFA pattern groups grouped based on the arrangements of G pixels (S511). The CFA pattern obtaining unit 202 controls the comparative image generation unit 204 to generate comparative image data from the input image data by re-demosaicing based on one CFA pattern group and the obtained DMA information (S512). Furthermore, the CFA pattern obtaining unit 202 controls the alteration detection unit 205 to calculate a difference between G components of the comparative image data and those of the input image data (S513). Then, the CFA pattern obtaining unit 202 determines whether or not differences of G components are calculated for all the obtained CFA pattern groups (S514). If CFA pattern groups for which differences are to be calculated still remain, the process returns to step S512 to calculate differences of G components based on the next CFA pattern group.

After the differences of G components are calculated for all the CFA pattern groups, the CFA pattern obtaining unit 202 selects a CFA pattern group used to generate comparative image data corresponding to the smallest difference of G components (S515). In other words, the CFA pattern obtaining unit 202 determines an arrangement of G pixels of a CFA pattern of the input image data. Then, the CFA pattern obtaining unit 202 obtains CFA patterns which belong to the selected CFA pattern group as CFA pattern candidates (S516).

Next, the CFA pattern obtaining unit 202 controls the comparative image generation unit 204 to generate comparative image data from the input image data by re-demosaicing based on one CFA pattern candidate and the obtained DMA information (S517). Furthermore, the CFA pattern obtaining unit 202 controls the alteration detection unit 205 to calculate differences between R and B components of the comparative image data and those of the input image data (S518). Then, the CFA pattern obtaining unit 202 determines whether or not differences of R and B components are calculated for all CFA patterns which belong to the selected CFA pattern group (S519). If CFA patterns for which differences are to be calculated still remain, the process returns to step S517 to calculate differences of R and B components based on the next CFA pattern.

After the differences of R and B components are calculated for all the CFA patterns which belong to the selected CFA pattern group, the CFA pattern obtaining unit 202 decides a CFA pattern used to generate comparative image data corresponding to the smallest difference as that of the input image data (S520). In other words, the CFA pattern obtaining unit 202 decides the arrangements of R and B pixels of the CFA pattern of the input image data. Note that comparative image data corresponding to the smallest difference may be determined based on a total of differences of R and B components and the like.

Modification of Embodiments

Figure 15:
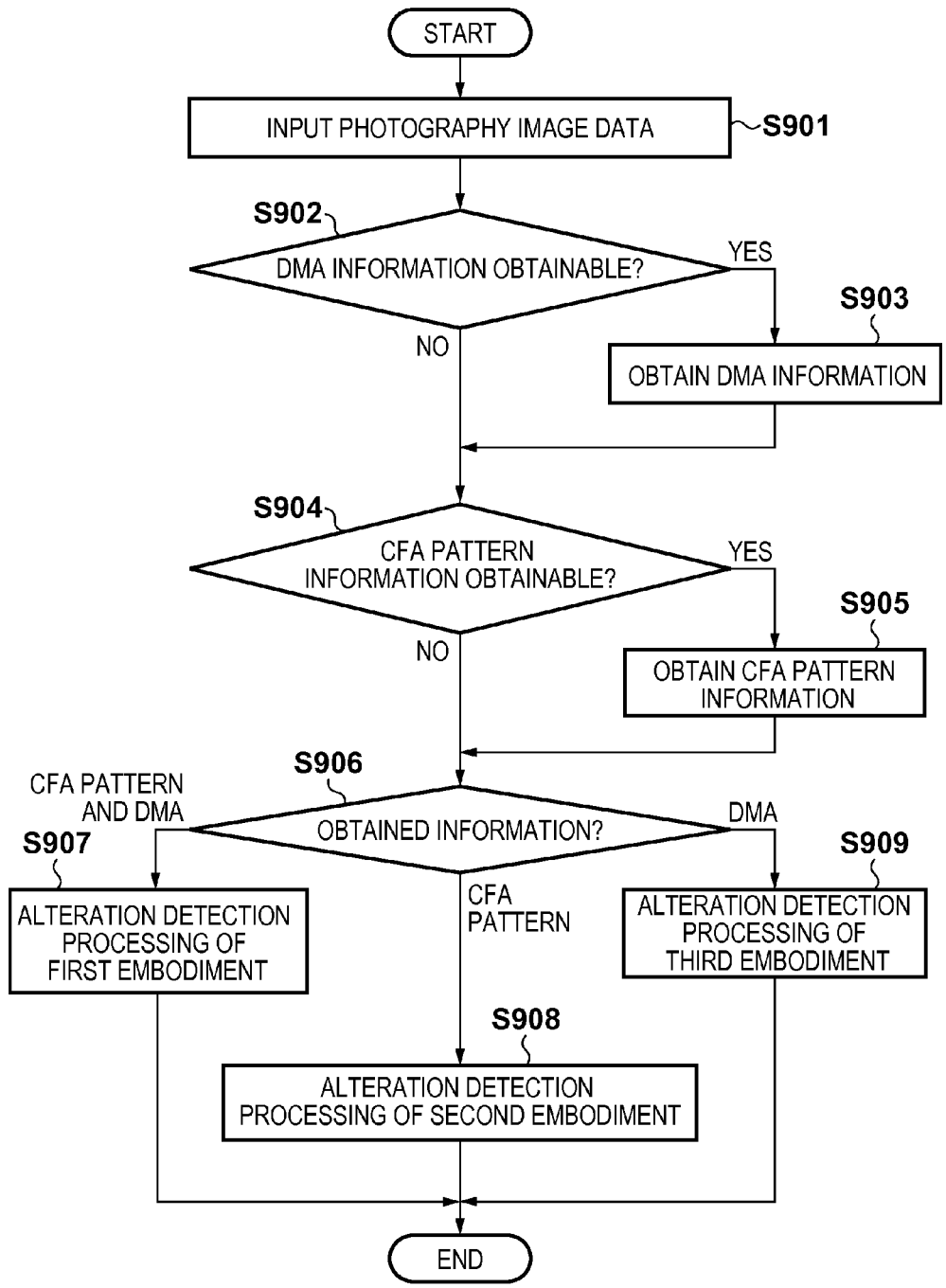
FIG. 15 is a flowchart for explaining switching of alteration detection processing.

Depending on whether or not a CFA pattern and DMA can be obtained, which of alteration detection process is to be executed can be switched among those described in the first, second, and third embodiments. Switching of the alteration detection processes will be described below with reference to the flowchart shown in FIG. 15.

The image input unit 201 inputs image data of a photography image (S901). The DMA obtaining unit 203 extracts photography camera information from metadata of the input image data, and determines with reference to the DB 801 or the like whether or not DMA information is obtainable (S902). If DMA information is obtainable, the DMA obtaining unit 203 obtains the DMA information (S903).

Next, the CFA pattern obtaining unit 202 determines with reference to the metadata of the input image data whether or not CFA pattern information is obtainable (S904). If CFA pattern information is obtainable, the CFA pattern obtaining unit 202 obtains the CFA pattern information (S905).

If it is determined in step S906 that the CFA pattern information and DMA information can be obtained, the alteration detection processing described in the first embodiment is executed using these pieces of information (S907).

On the other hand, if DMA information cannot be obtained, the alteration detection processing described in the second embodiment is executed (S908). That is, a DMA is estimated, and alteration detection is executed using the obtained CFA pattern information and the estimated DMA.

If CFA pattern information cannot be obtained, the alteration detection processing described in the third embodiment is executed (S909). That is, a CFA pattern is estimated, and alteration detection is executed using the estimated CFA pattern and the obtained DMA information.

Detection of an altered region using distinct CFA patterns different from the obtained CFA pattern as in the processing of the second embodiment is applicable to other embodiments. For example, in the alteration detection processing of the first embodiment shown in FIG. 9, an altered region detected in step S305 may be used as an alteration candidate region, and the distinct CFA pattern may be applied to that alteration candidate region to detect an altered region.

In the example of the above description, CFA pattern information is obtained from metadata of input image data. Alternatively, when a CFA pattern of image data is known, the user may designate the CFA pattern.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-017635 filed Jan. 31, 2013 which is hereby incorporated by reference herein in its entirety.

What is claimed is:

1. An image processing apparatus comprising:
   an obtaining unit configured to obtain pattern information of a color filter array and algorithm information of color interpolation processing used in photography of input image data;
   a generation unit configured to generate comparative image data by performing re-demosaicing on the input image data based on the pattern information and the algorithm information; and
   a detection unit configured to compare the comparative image data with the input image data to detect alteration of the input image data.

2. The apparatus according to claim 1, wherein the obtaining unit is configured to obtain the pattern information and the algorithm information based on metadata of the input image data.

3. The apparatus according to claim 1, wherein the obtaining unit is configured to obtain the pattern information based on the input image data, and compare comparative image data, which is generated by performing re-demosaicing on the input image data based on the obtained pattern information and an algorithm information candidate, with the input image data to estimate algorithm information of the color interpolation processing.

4. The apparatus according to claim 3,
   wherein the obtaining unit is configured to obtain another pattern information different from the pattern information obtained from the input image data,
   wherein the detection unit is configured to compare comparative image data, which is generated by performing re-demosaicing on the input image data based on the pattern information obtained based on the input image data and the estimated algorithm information, with the input image data so as to extract an alteration candidate region,
   wherein the generation unit is configured to generate comparative image data by performing re-demosaicing on image data of the alteration candidate region in the input image data based on the other pattern information and the estimated algorithm information, and
   wherein the detection unit is configured to compare the image data of the alteration candidate region with the comparative image data generated from the image data of the alteration candidate region to detect an altered region.

5. The apparatus according to claim 1, wherein the obtaining unit is configured to obtain first pattern information of a color filter array used in photography of the input image data and a plurality of candidates of algorithm information of color interpolation processing used in photography of the input image data,
   wherein the generation unit is configured to generate a plurality of comparative image data by performing re-demosaicing on the input image data based on the first pattern information and the plurality of candidates of algorithm information,
   wherein the detection unit is configured to compare the input image data with the plurality of comparative image data, and
   wherein the obtaining unit is configured to estimate algorithm information of color interpolation processing used in photography of the input image data based on results of the comparison.

6. The apparatus according to claim 5, wherein the generation unit is configured to generate first comparative image data by performing re-demosaicing on the input image data based on the first pattern information and the estimated algorithm information, and
   wherein the detection unit is configured to compare the first comparative image data with the input image data to extract an alteration candidate region.

7. The apparatus according to claim 6, wherein the obtaining unit is configured to obtain second pattern information indicating a pattern different from a pattern indicated by the first pattern information,
   wherein the generation unit is configured to generate second comparative image data by performing re-demosaicing on image data of the alteration candidate region in the input image data based on the second pattern information and the estimated algorithm information, and
   wherein the detection unit is configured to compare the image data of the alteration candidate region with the second comparative image data to detect an altered region.

8. The apparatus according to claim 6, wherein the detection unit is configured to compare the input image data and each of the plurality of comparative image data by computing an absolute sum of differences between each of the plurality of comparative image data and the input image and, in a case where no candidate of algorithm information results in an absolute sum of differences smaller than a predetermined threshold, extract the alteration candidate region.

9. The apparatus according to claim 1, wherein the obtaining unit is further configured to estimate an interpolation parameter of color interpolation processing used in the photography from comparison between the input image data, and comparative image data generated by performing re-demosaicing on the input image data in a case where an interpolation parameter of color interpolation processing indicated by the algorithm information is changed.

10. The apparatus according to claim 1, wherein the obtaining unit is configured to obtain the algorithm information based on the input image data, and compare comparative image data, which is generated by performing re-demosaicing on the input image data based on a candidate of pattern information corresponding to a color filter array usable in photography and the obtained algorithm information, with the input image data so as to estimate pattern information of a color filter array used in the photography.

11. The apparatus according to claim 10, wherein the obtaining unit is configured to compare Green ("G") components of comparative image data, which is generated by performing re-demosaicing on the input image data based on grouped pattern information and the obtained algorithm information, with G components of the input image data so as to estimate an arrangement of Green ("G") pixels in a color filter array usable in the photography, and determines pattern information having the estimated arrangement of G pixels as a candidate of pattern information of a color filter array used in the photography,
   wherein the pattern information are grouped based on the arrangement of G pixels to obtain the grouped pattern information.

12. The apparatus according to claim 1, further comprising an output unit configured to output visible information indicating an alteration detection result.

13. An image processing method executed by a processor, the method comprising:
- obtaining, by the processor, pattern information of a color filter array and algorithm information of color interpolation processing used in photography of input image data;
- generating, by the processor, comparative image data by performing re-demosaicing on the input image data based on the pattern information and the algorithm information; and
- comparing, by the processor, the comparative image data with the input image data to detect alteration of the input image data.

14. A non-transitory computer readable medium storing a computer-executable program for causing a computer to perform an image processing method, the method comprising:
- obtaining pattern information of a color filter array and algorithm information of color interpolation processing used in photography of input image data;
- generating comparative image data by performing re-demosaicing on the input image data based on the pattern information and the algorithm information; and
- comparing the comparative image data with the input image data to detect alteration of the input image data.

15. An image processing apparatus, comprising:
- at least one non-transitory memory device storing at least one program;
- at least one processor connected to the at least one non-transitory memory device and configured by the at least one program at least to:
- obtain pattern information of a color filter array and algorithm information of color interpolation processing used in photography of input image data;
- generate comparative image data by performing re-demosaicing on the input image data based on the pattern information and the algorithm information; and
- compare the comparative image data with the input image data to detect alteration of the input image data.

* * * * *